(12) United States Patent
Watanabe et al.

(10) Patent No.: US 10,793,070 B2
(45) Date of Patent: Oct. 6, 2020

(54) PERIPHERY MONITORING APPARATUS

(71) Applicant: AISIN SEIKI KABUSHIKI KAISHA, Kariya-shi, Aichi (JP)

(72) Inventors: Kazuya Watanabe, Anjo (JP); Yoji Inui, Ama-gun (JP); Kinji Yamamoto, Anjo (JP); Takashi Hiramaki, Nagoya (JP); Takuya Hashikawa, Nagoya (JP); Tetsuya Maruoka, Okazaki (JP); Naotaka Kubota, Kariya (JP); Osamu Kimura, Nagoya (JP); Itsuko Ohashi, Nagoya (JP)

(73) Assignee: AISIN SEIKI KABUSHIKI KAISHA, Kariya-shi, Aichi-ken (JP)

( * ) Notice: Subject to any disclaimer, the term of this patent is extended or adjusted under 35 U.S.C. 154(b) by 0 days.

(21) Appl. No.: 16/337,552

(22) PCT Filed: Mar. 23, 2017

(86) PCT No.: PCT/JP2017/011646
§ 371 (c)(1),
(2) Date: Mar. 28, 2019

(87) PCT Pub. No.: WO2018/061256
PCT Pub. Date: Apr. 5, 2018

(65) Prior Publication Data
US 2020/0031281 A1 Jan. 30, 2020

(30) Foreign Application Priority Data
Sep. 30, 2016 (JP) .................. 2016-194400

(51) Int. Cl.
*B60R 1/00* (2006.01)
*H04N 13/111* (2018.01)
(Continued)

(52) U.S. Cl.
CPC .............. *B60R 1/00* (2013.01); *G06T 19/006* (2013.01); *H04N 13/111* (2018.05);
(Continued)

(58) Field of Classification Search
None
See application file for complete search history.

(56) References Cited

U.S. PATENT DOCUMENTS

2002/0196263 A1  12/2002  Muramori et al.
2002/0196269 A1* 12/2002  Mo ...................... G11B 27/034
                                                      715/721

(Continued)

FOREIGN PATENT DOCUMENTS

JP       10288516 A    * 10/1998
JP      2003-077008 A    3/2003

(Continued)

OTHER PUBLICATIONS

Fukuhara et al., "Difference-in-Level Measuring Device of Plane", Translation for JPH10288516A (Year: 1998).*

(Continued)

*Primary Examiner* — Michael J Cobb
(74) *Attorney, Agent, or Firm* — Sughrue Mion, PLLC

(57) ABSTRACT

A periphery monitoring apparatus having an acquisition unit that acquires a three-dimensional model image. The three-dimensional model image indicates an irregular state of a road surface. The three-dimensional model image includes image data outputted from an imaging unit that takes a peripheral image including the road surface in a traveling direction of a vehicle and includes height data that indicates heights of individual regions of the road surface represented in the peripheral image. The periphery monitoring apparatus also includes a control that superimposes an indicator of a height of the road surface based on the height data onto each (Continued)

region included in the acquired three-dimensional model image and displays the three-dimensional model image on a display device.

6 Claims, 20 Drawing Sheets

(51) Int. Cl.
  *G06T 19/00* (2011.01)
  *G06T 1/00* (2006.01)
  *G06T 17/05* (2011.01)
(52) U.S. Cl.
  CPC . *B60R 2300/305* (2013.01); *B60R 2300/8086* (2013.01); *G06T 2207/30252* (2013.01); *G06T 2219/2012* (2013.01)

(56) References Cited

U.S. PATENT DOCUMENTS

| | | | | |
|---|---|---|---|---|
| 2005/0134716 A1* | 6/2005 | Vice | ........................ | G06T 15/20 348/333.02 |
| 2008/0262988 A1* | 10/2008 | Williams | ................. | G06N 3/12 706/13 |
| 2011/0175752 A1* | 7/2011 | Augst | ....................... | B60R 1/00 340/905 |
| 2012/0081542 A1* | 4/2012 | Suk | ........................ | H04N 7/181 348/139 |
| 2012/0114181 A1* | 5/2012 | Borthwick | .............. | G06T 7/593 382/104 |
| 2012/0288154 A1* | 11/2012 | Shima | .................... | G08G 1/167 382/103 |
| 2014/0125655 A1* | 5/2014 | Kunath | .................. | G01C 21/32 345/419 |
| 2014/0347448 A1* | 11/2014 | Hegemann | ................ | G06T 7/90 348/46 |
| 2015/0197197 A1 | 7/2015 | Watanabe et al. | | |
| 2016/0110919 A1* | 4/2016 | Hancock | ............... | G06T 19/006 345/428 |
| 2016/0342848 A1* | 11/2016 | Seki | ...................... | G06K 9/4661 |
| 2017/0018115 A1* | 1/2017 | Blanchard | ............... | G06T 15/08 |
| 2017/0024617 A1* | 1/2017 | Yamaguchi | ............ | G01C 21/28 |
| 2017/0084038 A1* | 3/2017 | Dane | ....................... | G06T 7/507 |
| 2017/0089710 A1* | 3/2017 | Slusar | ................ | G01C 21/3602 |
| 2017/0175364 A1* | 6/2017 | Hasegawa | ............... | E02F 9/261 |
| 2017/0261315 A1* | 9/2017 | Yamaguchi | ............ | G01C 21/28 |
| 2017/0270370 A1* | 9/2017 | Utagawa | .................. | B60R 1/00 |
| 2018/0001887 A1* | 1/2018 | Watanabe | ........... | B60W 30/146 |

FOREIGN PATENT DOCUMENTS

| | | | | |
|---|---|---|---|---|
| JP | 2003-098957 A | | 4/2003 | |
| JP | 2003-244688 A | | 8/2003 | |
| JP | 2003244688 A | * | 8/2003 | |
| JP | 2005-316687 A | | 11/2005 | |
| JP | 2006-107521 A | | 4/2006 | |
| JP | 2009-168582 A | | 7/2009 | |
| JP | 2009-247463 A | | 10/2009 | |
| JP | 5489890 B2 | | 5/2014 | |
| JP | 2015-133603 A | | 7/2015 | |

OTHER PUBLICATIONS

Sato et al., "Image Processing System for Vehicle" Translation for JP2003-244688 (Year: 2003).*
International Search Report for PCT/JP2017/011646 dated May 16, 2017 [PCT/ISA/210].

* cited by examiner

PERIPHERY MONITORING APPARATUS

CROSS-REFERENCE TO RELATED APPLICATIONS

This application is national stage application of International Application No. PCT/JP2017/011646, filed Mar. 23, 2017, claiming priority based on Japanese Patent Application No. 2016-194400 filed Sep. 30, 2016, which designates the United States, incorporated herein by reference.

TECHNICAL FIELD

Embodiments of the present invention relate to a periphery monitoring apparatus.

BACKGROUND ART

Conventionally, there have been developed a technique of creating a map that is able to be stereoscopically viewed by using an image acquired as an aerial photograph and location information including height information.

CITATION LIST

Patent Literature

Patent Document 1: Japanese Patent Application Laid-open No. 2003-98957

SUMMARY OF INVENTION

Problem to be Solved by the Invention

However, a main target of display in the above-described technique of creating a map is a wide range. Thus, such a technique is not appropriate for, for example, displaying a limited region around a vehicle by a vehicle-mounted display device. In a case of the vehicle-mounted display device, a screen size is hardly increased because an arrangement space is limited, so that a user hardly feels a stereoscopic effect even when display content is a stereoscopic image.

An object of the present invention is to provide a periphery monitoring apparatus that is capable of performing display such that, when displaying a peripheral image representing a peripheral situation of the vehicle on a display device disposed in a compartment, a stereoscopic effect of image content is clearer and a peripheral situation of the vehicle is more easily grasped.

Means for Solving Problem

A periphery monitoring apparatus according to embodiments of the present invention may comprise: an acquisition unit configured to acquire a three-dimensional model image indicating an irregular state of a road surface, the three-dimensional model image including taken image data output from an imaging unit that takes a peripheral image including the road surface in a traveling direction of a vehicle and including height data that indicates heights of individual regions of the road surface represented in the peripheral image; and a control unit configured to superimpose an indicator indicating a height of the road surface based on the height data onto each region included in the acquired three-dimensional model image and display the three-dimensional model image on a display device. With this configuration, since the indicator indicating the height of the road surface is superimposed and displayed on each region included in the three-dimensional model image, the height of the road surface can be intuitively grasped.

In the periphery monitoring apparatus according to embodiments of the present invention, the indicator may be a wire frame indicating the irregular state of the road surface. With this configuration, since variation of the height is expressed by variation of inclination of wires constituting the wire frame, variation of the height may be expressed more obviously, and the height of the road surface can be more intuitively grasped.

In the periphery monitoring apparatus according to embodiments of the present invention, the indicator may be a contour line that connects a plurality of positions having the same height with respect to a predetermined surface of the road surface. With this configuration, since portions of the road surface having substantially the same height are clarified, a height configuration of the road surface can be more intuitively grasped.

In the periphery monitoring apparatus according to embodiments of the present invention, the indicator may be a plurality of movement marks that are movable in accordance with a gradient direction of each region of the three-dimensional model image, and the control unit may cause moving speed of the movement marks to vary in accordance with a gradient state of each region. With this configuration, since irregularities of the road surface may be further clarified due to presence of the movement mark that is moving, and a gradient of the road surface is expressed by the moving speed of the movement mark, a gradient configuration of the road surface can be more intuitively grasped.

In the periphery monitoring apparatus according to embodiments of the present invention, the indicator may be a scanning line that moves in a predetermined direction on the three-dimensional model image, the scanning line indicating the height of the road surface based on the height data. With this configuration, since the scanning line moves on the three-dimensional model image in a predetermined direction while the shape of the scanning line varies in accordance with the shape of the road surface, a partial road surface shape can be easily grasped. Note that the number of scanning lines may be one or plural. Visibility of a road surface image represented as the three-dimensional model image can be improved by reducing the number of the scanning lines.

In the periphery monitoring apparatus according to embodiments of the present invention, the control unit may display the indicator with a complementary color of a color of the road surface in a region of the three-dimensional model image on which the indicator is superimposed. With this configuration, by displaying the indicator in the complementary color of the display color of the road surface included in the three-dimensional model image, a discrimination property of the indicator may be further improved, and the shape of the road surface can be more easily grasped.

In the periphery monitoring apparatus according to embodiments of the present invention, the control unit may cause a display mode of the indicator to vary in accordance with the height of the road surface. With this configuration, the height of the road surface can be more easily grasped.

In the periphery monitoring apparatus according to embodiments of the present invention, the control unit may superimpose, together with the indicator, a route indicator indicating an estimated traveling direction based on a rudder angle of the vehicle onto the three-dimensional model image. With this configuration, the height (height difference)

of the road surface in an estimated traveling direction of the vehicle can be easily grasped, and a route on which the vehicle is able to comfortably travel can be more easily selected.

In the periphery monitoring apparatus according to embodiments of the present invention, the control unit may cause a display mode of the indicator to vary between the region on which the route indicator is superimposed and other regions. With this configuration, the height information of the road surface in a scheduled traveling direction of the vehicle can be provided in more detail, and display of height information of a region other than a region in the scheduled traveling direction can be simplified. Therefore, a load of arithmetic processing can be reduced, and visibility of the entire screen can be improved.

DESCRIPTION OF EMBODIMENTS

An exemplary embodiment of the present invention will be disclosed below. A configuration of the embodiment described below, and a function, a result, and an effect obtained through the configuration are merely examples. The present invention can be implemented by a configuration other than the configuration disclosed in the following embodiment, and at least one of various effects and derivative effects based on a basic configuration can be obtained.

In the present embodiment, a vehicle 1 equipped with a periphery monitoring apparatus (periphery monitoring system) may be, for example, an automobile including an internal combustion engine (not illustrated) as a driving source, that is, an internal combustion engine automobile, or may be an automobile including an electric motor (not illustrated) as a driving source, that is, an electric vehicle, a fuel battery automobile, and the like. The vehicle 1 may be a hybrid automobile including both of the internal combustion engine and the electric motor as a driving source, or may be an automobile including another driving source. The vehicle 1 can be equipped with various shifting devices, and can be equipped with various devices required for driving an internal combustion engine or an electric motor, for example, a system, a component, and the like. The vehicle 1 is, for example, a vehicle that can favorably perform "off-road" traveling (mainly on an unpaved rough terrain road and the like) in addition to what is called "on-road" traveling (mainly on a paved road or a road equivalent thereto). A driving system may be a four-wheel-drive vehicle that transmits driving force to all of four wheels 3 to use all the four wheels as driving wheels. A system, the number, layout, and the like of the device related to driving of the wheel 3 can be variously set. The driving system is not limited to a four-wheel driving system, and may be a front wheel driving system or a rear wheel driving system, for example.

Figure 1:
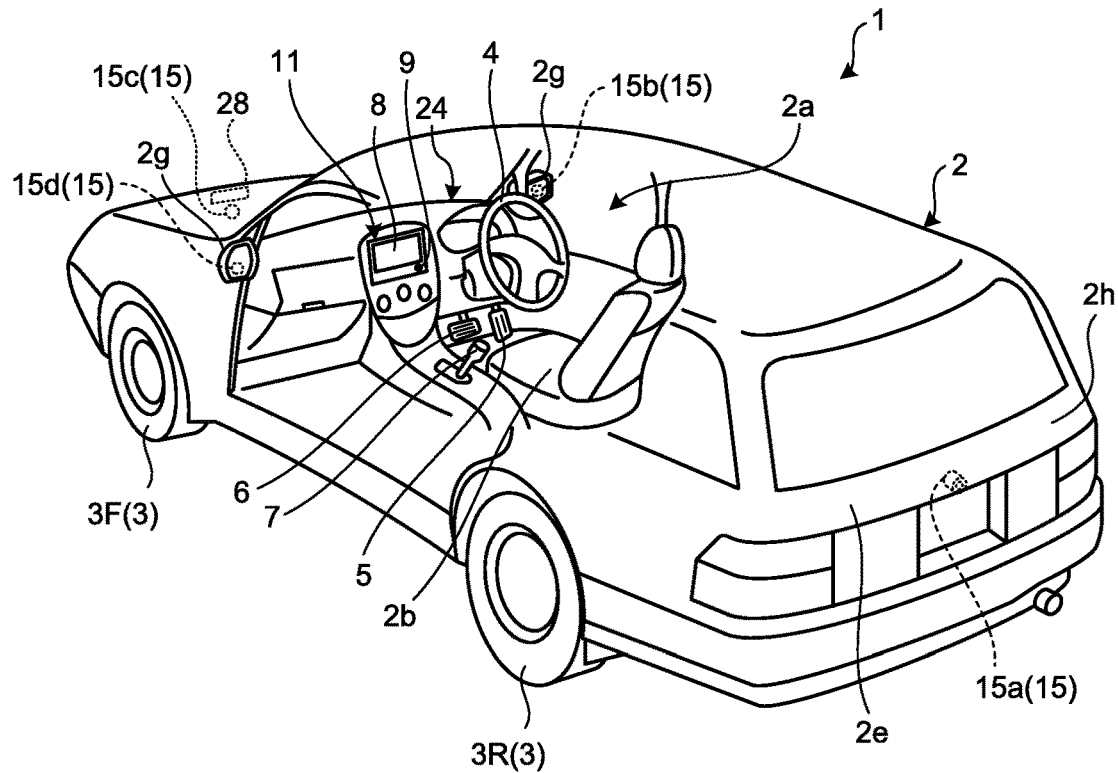
FIG. 1 is a perspective view illustrating an example of a see-through state of part of a compartment of a vehicle equipped with a periphery monitoring apparatus according to the embodiments.

As illustrated in FIG. 1, a vehicle body 2 constitutes a compartment 2a in which an occupant (not illustrated) is seated. In the compartment 2a, a steering unit 4, an acceleration operating unit 5, a braking operating unit 6, a gear shift operating unit 7, and the like are disposed in a state of facing a seat 2b of a driver as the occupant. The steering unit 4 is, for example, a steering wheel projecting from a dashboard 24. The acceleration operating unit 5 is, for example, an accelerator pedal positioned at the driver's feet. The braking operating unit 6 is, for example, a brake pedal positioned at the driver's feet. The gear shift operating unit 7 is, for example, a shift lever projecting from a center console. The steering unit 4, the acceleration operating unit 5, the braking operating unit 6, the gear shift operating unit 7, and the like are not limited thereto.

In the compartment 2a, a display device 8 and a voice output device 9 are disposed. The display device 8 is, for example, a liquid crystal display (LCD) or an organic electroluminescent display (OELD). The voice output device 9 is, for example, a speaker. The display device 8 is, for example, covered with a transparent operation input unit 10 such as a touch panel. The occupant can visually recognize an image displayed on a display screen of the display device 8 via the operation input unit 10. The occupant can perform an operation input by touching, pressing, or moving the operation input unit 10 to be operated with a finger and the like at a position corresponding to the image displayed on the display screen of the display device 8. The display device 8, the voice output device 9, the operation input unit 10, and the like are disposed, for example, in a monitor device 11 positioned at a center part in a vehicle width direction, that is, a horizontal direction of the dashboard 24. The monitor device 11 can include an operation input unit (not illustrated) such as a switch, a dial, a joystick, or a push button. A voice output device (not illustrated) can be disposed at a position different from that of the monitor device 11 in the compartment 2a, and voice can be output from the voice output device 9 of the monitor device 11 and another voice output device. The monitor device 11 may also be used for a navigation system or an audio system at the same time, for example.

Figure 2:
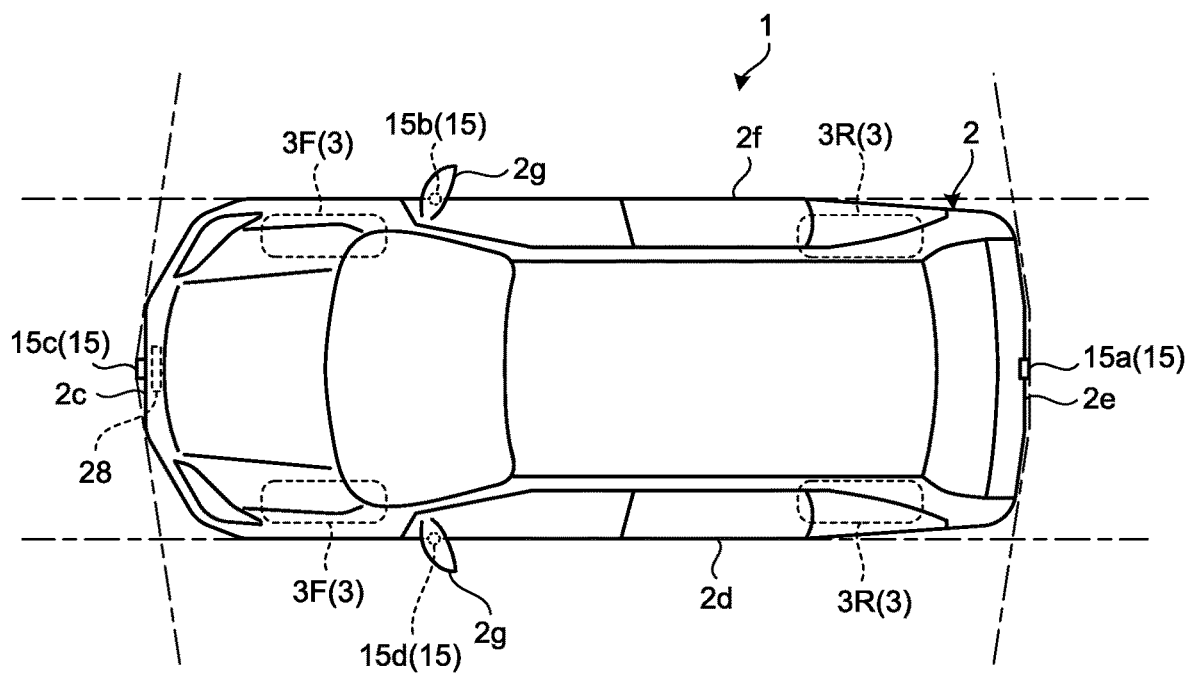
FIG. 2 is a plan view illustrating an example of the vehicle equipped with the periphery monitoring apparatus according to the embodiments.

As illustrated in FIG. 1 and FIG. 2, for example, the vehicle 1 is a four-wheeled automobile, and includes two left and right front wheels 3F and two left and right rear wheels 3R. All these four wheels 3 may be configured to be able to be turned. As exemplified in FIG. 3, the vehicle 1 includes a steering system 13 that steers at least two of the wheels 3. The steering system 13 includes an actuator 13a and a torque sensor 13b. The steering system 13 is electrically controlled by an electronic control unit (ECU) 14 and the like to cause the actuator 13a to operate. The steering system 13 is, for example, an electric power steering system or a steer by wire (SBW) system. The steering system 13 applies torque, that is, assist torque to the steering unit 4 by the actuator 13a to compensate steering force, or turns the wheel 3 by the actuator 13a. In this case, the actuator 13a may turn one wheel 3, or may turn a plurality of wheels 3. The torque sensor 13b detects, for example, torque applied to the steering unit 4 by the driver.

By way of example, the periphery monitoring apparatus (periphery monitoring system) according to the present embodiment acquires a three-dimensional model image indicating an irregular (rugged) state of the road surface including an image based on taken image data output from an imaging unit 15 that images a peripheral region including a traveling direction of the vehicle 1, and height data indicating heights of individual regions of the road surface represented in the image. The region of the road surface is a region representing an area that can be appropriately set. The region of the road surface may be, for example, a region defined for each pixel constituting the screen, or a region defined as a set of predetermined number of adjacent pixels. The region of the road surface may also be a partition defined by dividing the screen into a plurality of parts. An indicator indicating the height of the road surface (for example, a wire frame whose rugged state varies depending on the height data indicating the height) is superimposed onto each region included in the three-dimensional model image to be displayed on the display device 8. By superimposing the indicator (for example, the wire frame) indicating the height of the road surface onto each region included in the three-dimensional model image to be displayed, the periphery monitoring apparatus can cause the height of the road surface to be easily and intuitively grasped by a user (driver).

As exemplified in FIG. 2, the vehicle body 2 includes, for example, four imaging units 15a to 15d disposed therein as a plurality of imaging units 15. The imaging unit 15 is, for example, a digital camera incorporating an imaging element such as a charge coupled device (CCD) or a CMOS image sensor (CIS). The imaging unit 15 can output moving image data (taken image data) at a predetermined frame rate. Each of the imaging units 15 includes a wide-angle lens or a fisheye lens, and can photograph, for example, a range from 140° to 220° in the horizontal direction. An optical axis of the imaging unit 15 may be set obliquely downward. Thus, the imaging unit 15 successively photographs external environment including a road surface on which the vehicle 1 can move and surrounding objects (an obstacle, a rock, a depression, and the like) to be output as the taken image data.

The imaging unit 15a is, for example, positioned at an end part 2e on a rear side of the vehicle body 2, and disposed on a wall part under a rear window of a door 2h of a rear hatch. The imaging unit 15b is, for example, positioned at an end part 2f on the right side of the vehicle body 2, and disposed on a door mirror 2g on the right side. The imaging unit 15c is, for example, positioned on a front side of the vehicle body 2, that is, at a front end part 2c in a vehicle longitudinal direction, and is disposed on a front bumper, a front grille, and the like. The imaging unit 15c may be disposed on a back surface of a room mirror (a surface opposed to a windshield) inside the compartment 2a, for example. In this case, the imaging unit 15c is preferably installed so that an imaging range of the imaging unit 15c is included in a wiping region of windshield wipers. The imaging unit 15d is, for example, positioned on the left side of the vehicle body 2, that is, at an end part 2d on the left side in the vehicle width direction, and is disposed on the door mirror 2g on the left side. The ECU 14 constituting a periphery monitoring system 100 may perform arithmetic processing or image processing based on the taken image data obtained by the imaging units 15 to generate an image having a wider viewing angle, or a virtual overhead image obtained by viewing the vehicle 1 from above. The ECU 14 performs arithmetic processing or image processing on data of a wide-angle image obtained by the imaging unit 15 to generate an image obtained by cutting out a specific region, generate image data representing only a specific region, or generate image data in which only a specific region is emphasized. The ECU 14 can convert the taken image data into virtual image data that seems to be imaged from a viewpoint (virtual viewpoint) different from the viewpoint from which the imaging unit 15 takes the image (viewpoint conversion). By displaying the acquired image data on the display device 8, for example, the ECU 14 can provide periphery monitoring information for confirming safety on the right side and the left side of the vehicle 1, and confirming safety around the vehicle 1 by overlooking the vehicle 1.

As described above, the ECU 14 according to the present embodiment acquires a three-dimensional model image representing an irregular state (three-dimensional shape) of the road surface based on the height data indicating the height for each region of the road surface, and displays the three-dimensional model image on the display device 8 together with the indicator (for example, the wire frame) indicating the height for each region of the road surface. The irregular state of the road surface can be detected by various methods. For example, an object is photographed by two imaging units (cameras) at the same time using a stereo camera to detect a position and a stereoscopic shape of the object based on a difference in position (parallax) on the image of the object obtained by the respective cameras. Thus, in a case of acquiring irregularity information of the road surface in front of the vehicle 1, the imaging unit 15c may be a stereo camera. In this case, the imaging unit 15c can image a peripheral image on which the indicator is superimposed, and can also acquire shape information (three-dimensional information) of the road surface included in the peripheral image. By using the shape information (three-dimensional information) of the road surface, for example, an aspect of the wire frame as the indicator can be determined.

As another example of detecting the irregular state (stereoscopic information, three-dimensional information) of the road surface, a laser scanner 28 can be utilized. In this case, the imaging unit 15c may be a monocular camera, and images a peripheral image (two-dimensional image) on which the indicator (for example, the wire frame) is superimposed. The three-dimensional information (irregularity information) of the road surface acquired by the laser scanner 28 is then added to the two-dimensional image acquired by the imaging unit 15c as a monocular camera to obtain a three-dimensional model image. By using the shape information (three-dimensional information) of the road surface acquired by the laser scanner 28, for example, an aspect of the wire frame as the indicator is determined. In a case of generating the three-dimensional model image using the three-dimensional information (irregularity information) of the road surface, part of the road surface may be three-dimensionally displayed, or the entire road surface may be three-dimensionally displayed. In a case of detecting the irregular state (stereoscopic information, three-dimensional information) of the road surface in the rear of the vehicle 1, a stereo camera may be used as the imaging unit 15a, or the laser scanner 28 having a detection range including the rear of the vehicle 1 may be disposed. The laser scanner 28 and the stereo camera may be used at the same time. In this case, the irregular state of the road surface can be detected with higher accuracy.

Figure 3:
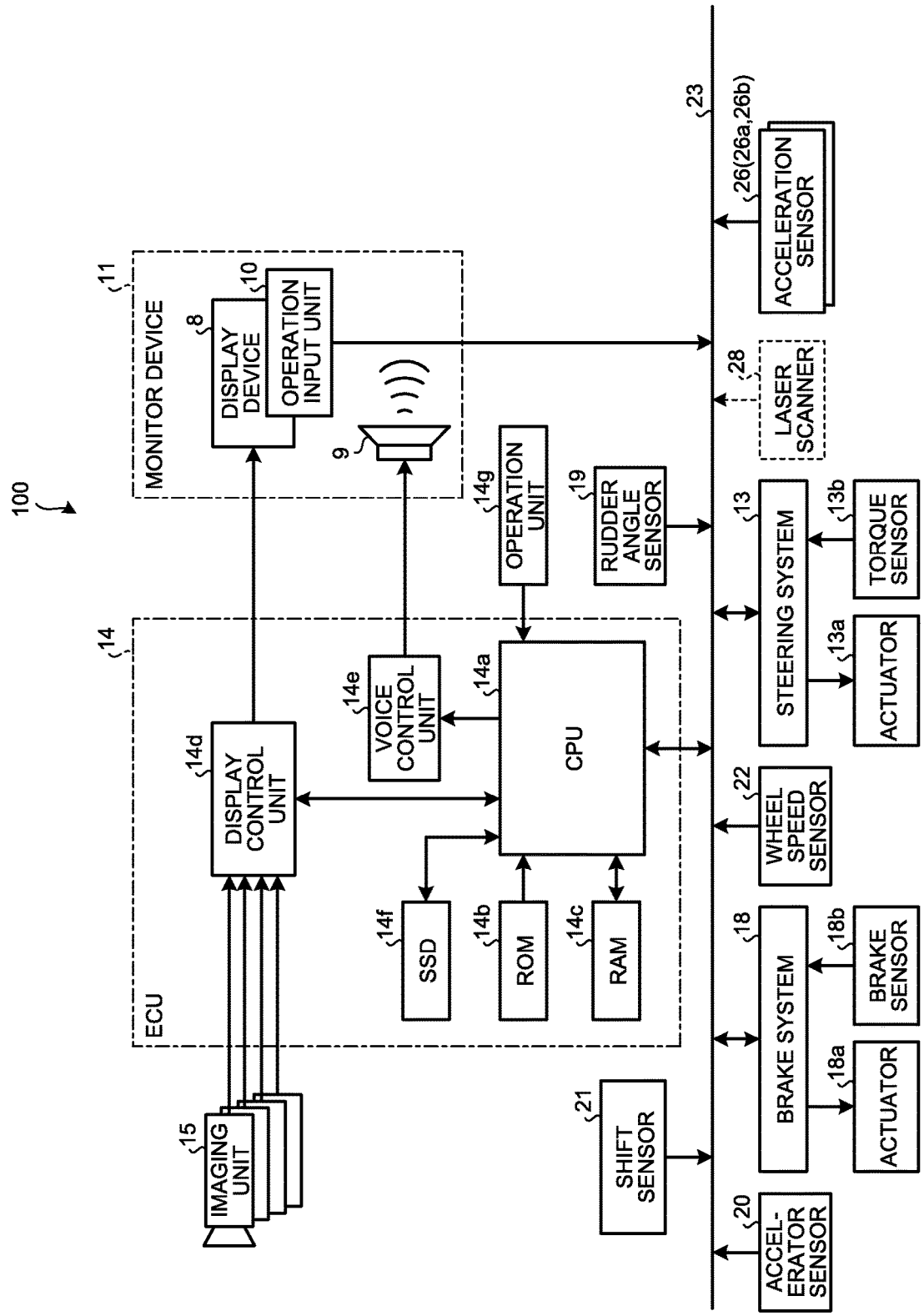
FIG. 3 is a block diagram illustrating an example of a periphery monitoring system including the periphery monitoring apparatus according to the embodiments.

As exemplified in FIG. 3, in the periphery monitoring system 100 (periphery monitoring apparatus), a brake system 18, a rudder angle sensor 19, an accelerator sensor 20, a shift sensor 21, a wheel speed sensor 22, an acceleration sensor 26 (26a, 26b), and the like in addition to the ECU 14, the monitor device 11, the steering system 13, and the like are electrically connected via an in-vehicle network 23 as an electric communication line. The in-vehicle network 23 is, for example, configured as a controller area network (CAN). The ECU 14 can control the steering system 13, the brake system 18, and the like by transmitting a control signal via the in-vehicle network 23. Additionally, the ECU 14 can receive detection results of the torque sensor 13b, a brake sensor 18b, the rudder angle sensor 19, the accelerator sensor 20, the shift sensor 21, the wheel speed sensor 22, the acceleration sensor 26, and the like, and an operation signal from the operation input unit 10 and the like via the in-vehicle network 23. In a case of using a monocular camera as the imaging unit 15c, the laser scanner 28 is connected to the in-vehicle network 23, and the ECU 14 may detect the irregular state of the road surface based on the detection result of the laser scanner 28.

The ECU 14 includes, for example, a central processing unit (CPU) 14a, a read only memory (ROM) 14b, a random access memory (RAM) 14c, a display control unit 14d, a voice control unit 14e, a solid state drive 14f (SSD, flash memory), and the like. For example, the CPU 14a performs processing of generating a three-dimensional model image, generating a wire frame and the like as the indicator to be superimposed onto the three-dimensional image, determining a display mode of the indicator, and the like as image processing related to the image displayed on the display device 8. The CPU 14a also performs various arithmetic operations and processing of various kinds such as processing of calculating a route indicator indicating an estimated traveling direction of the vehicle 1 and guide (notification) processing for calling attention to the irregular state of the road surface. The CPU 14a reads out a program stored (installed) in a non-volatile storage device such as the ROM 14b, and performs arithmetic processing in accordance with the program.

The RAM 14c temporarily stores various pieces of data used for the arithmetic operation performed by the CPU 14a. Among pieces of arithmetic processing performed by the ECU 14, the display control unit 14d mainly performs image processing using the taken image data obtained by the imaging unit 15, image processing (for example, image synthesis) of the image data displayed on the display device 8, and the like. Among the pieces of arithmetic processing performed by the ECU 14, the voice control unit 14e mainly performs processing of voice data output from the voice output device 9. The SSD 14f is a rewritable nonvolatile storage unit, and can store data even when a power supply of the ECU 14 is turned off. The CPU 14a, the ROM 14b, the RAM 14c, and the like can be accumulated in the same package. The ECU 14 may include another logical operation processor such as a digital signal processor (DSP), a logic circuit, and the like in place of the CPU 14*a*. A hard disk drive (HDD) may be disposed in place of the SSD 14*f*, and the SSD 14*f* or the HDD may be disposed separately from the ECU 14 for periphery monitoring.

The brake system 18 is, for example, an anti-lock brake system (ABS) that prevents a brake from being locked, a sideslip prevention device (electronic stability control: ESC) that prevents the vehicle 1 from sideslipping at the time of cornering, an electric brake system that enhances braking force (performs brake assist), and a brake by wire (BBW). The brake system 18 applies braking force to the wheel 3, and by extension to the vehicle 1, via an actuator 18*a*. The brake system 18 can execute various kinds of control by detecting signs of locking of the brake, idling of the wheel 3, sideslipping, and the like based on a difference in rotation between the left and the right wheels 3. For example, the brake sensor 18*b* is a sensor that detects a position of a movable part (for example, a brake pedal) of the braking operating unit 6. The brake sensor 18*b* includes a displacement sensor.

The rudder angle sensor 19 is, for example, a sensor that detects a steering amount of the steering unit 4 such as a steering wheel. The rudder angle sensor 19 may be constituted of, for example, a hall element. The ECU 14 acquires, from the rudder angle sensor 19, a steering amount of the steering unit 4 by the driver, a steering amount of each wheel 3 at the time of automatic steering, and the like, and executes various kinds of control. The rudder angle sensor 19 detects a rotation angle of a rotary portion included in the steering unit 4. The rudder angle sensor 19 is an example of an angle sensor. A detection result of the rudder angle sensor 19 is used for determining a direction of the route indicator in a case of displaying the route indicator.

The accelerator sensor 20 is, for example, a sensor that detects a position of a movable part (for example, an accelerator pedal) of the acceleration operating unit 5. The accelerator sensor 20 includes a displacement sensor.

The shift sensor 21 is, for example, a sensor that detects a position of a movable part of the gear shift operating unit 7. The shift sensor 21 can detect positions of a lever, an arm, a button, and the like as movable parts. The shift sensor 21 may include a displacement sensor, or may be configured as a switch.

The wheel speed sensor 22 is a sensor that detects a rotation amount and a rotation rate per unit time of the wheel 3. The wheel speed sensor 22 is disposed for each wheel 3, and outputs a wheel speed pulse number indicating the rotation rate detected for each wheel 3 as a sensor value. The wheel speed sensor 22 may be constituted of, for example, a hall element. The ECU 14 calculates a movement amount of the vehicle 1 based on the sensor value acquired from the wheel speed sensor 22 to execute various kinds of control. In a case of calculating vehicle speed of the vehicle 1 based on the sensor value of each wheel speed sensor 22, the ECU 14 determines the vehicle speed of the vehicle 1 based on the speed of the wheel 3 having the smallest sensor value among the four wheels, and executes various kinds of control. In a case where there is the wheel 3 having a larger sensor value than that of the other wheels 3 among the four wheels, for example, there is the wheel 3 whose rotation rate is larger than that of the other wheels 3 by a predetermined number or more per unit period (unit time or unit distance), the ECU 14 assumes that the wheel 3 is in a slipping state (idling state), and executes various kinds of control. The wheel speed sensor 22 is disposed in the brake system 18 in some cases. In such a case, the ECU 14 acquires the detection result of the wheel speed sensor 22 via the brake system 18.

For example, two acceleration sensors 26 (26*a*, 26*b*) are disposed in the vehicle 1. The ECU 14 calculates inclination (pitch angle) in a longitudinal direction of the vehicle 1 and inclination (roll angle) in a horizontal direction thereof based on a signal from the acceleration sensors 26 (26*a*, 26*b*). The pitch angle is an angle indicating inclination about a lateral axis of the vehicle 1, and is 0 degrees when the vehicle 1 is present on a horizontal plane (the ground, the road surface). The roll angle is an angle indicating inclination about a longitudinal axis of the vehicle 1, and is 0 degrees when the vehicle 1 is present on a horizontal plane (the ground, the road surface). That is, it is possible to detect whether the vehicle 1 is present on a horizontal road surface, or on an inclined surface (a road surface having a rising gradient or a road surface having a falling gradient), and the like. In a case in which the vehicle 1 is equipped with an ESC, an acceleration sensor that is conventionally mounted on the ESC may be used. The acceleration sensor 26 is not limited to the present embodiment, and may be any sensor that can detect acceleration in the longitudinal and lateral direction of the vehicle 1.

The laser scanner 28 may be provided for detecting the irregular state of the road surface. For example, the laser scanner 28 is disposed on a front body of the vehicle body 2 (the end part 2*c* on a front side in the vehicle longitudinal direction), and acquires state information indicating the state of the road surface in the traveling direction of the vehicle 1. When a laser beam emitted from a light source (laser diode and the like) within the sensor of the laser scanner 28 impinges on a measuring object (for example, a road surface or a three-dimensional object), the laser beam is reflected and received by a light receiving element. By evaluating and calculating the received reflected light, a distance to a position at which the laser beam is reflected is calculated. As a result, the ECU 14 acquires relative state information (irregularity information, relative inclination, and the like) of the road surface in front of the vehicle 1 with respect to the road surface on which the vehicle 1 is present, the relative state information including the state of the road surface, for example, whether there are irregularities (gradient), a position at which irregularities are found (irregularity position), a degree of irregularities (gradient value), a state of irregularities (gradient) (a rising gradient, a falling gradient), and the like.

The configuration, the arrangement, the electrical connection form, and the like of the various sensors and the actuator described above are merely examples, and can be variously set (modified).

Figure 4:
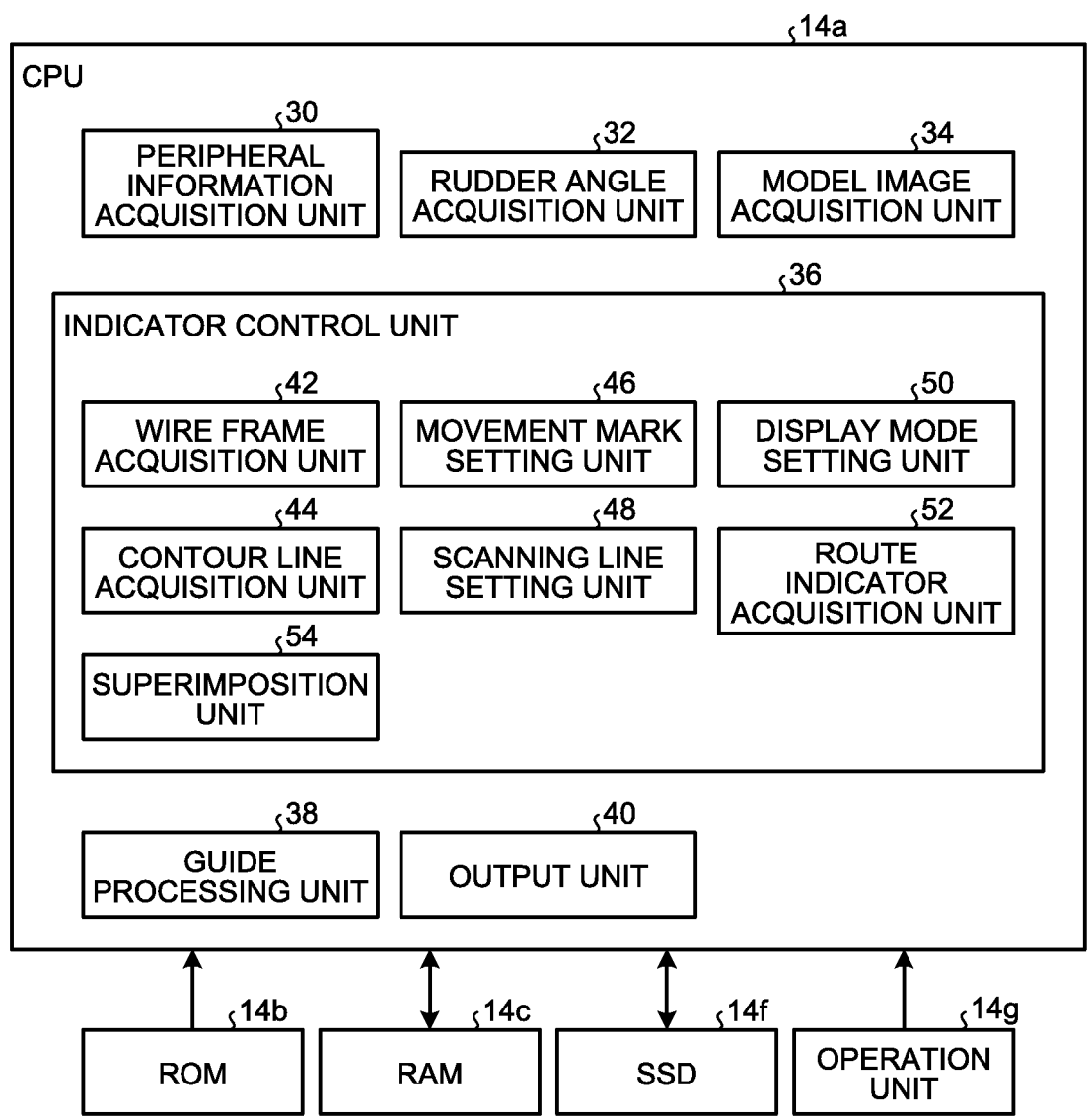
FIG. 4 is a block diagram illustrating an example of a configuration of a control unit (CPU) for displaying an indicator implemented in an ECU of the periphery monitoring apparatus according to the embodiments.

The CPU 14*a* included in the ECU 14 includes various modules as illustrated in FIG. 4 to implement superimposed display of the indicator indicating the height (a wire frame, a contour line, a movement mark, a scanning line, and the like) on the three-dimensional model image as described above. The CPU 14*a* includes, as the modules, a peripheral information acquisition unit 30, a rudder angle acquisition unit 32, a model image acquisition unit 34, an indicator control unit 36, a guide processing unit 38, an output unit 40, and the like. The indicator control unit 36 includes a wire frame acquisition unit 42, a contour line acquisition unit 44, a movement mark setting unit 46, a scanning line setting unit 48, a display mode setting unit 50, a route indicator acquisition unit 52, a superimposition unit 54, and the like. These modules can be implemented by reading out and executing a program installed and stored in a storage device such as the ROM 14*b*. By performing processing with the various modules, the CPU 14*a* causes the display device 8 to display a screen 8*a* in which a wire frame 62 as an example of the indicator is superimposed on a road surface 60 displayed as a three-dimensional model image as illustrated in FIG. 5.

Figure 5:
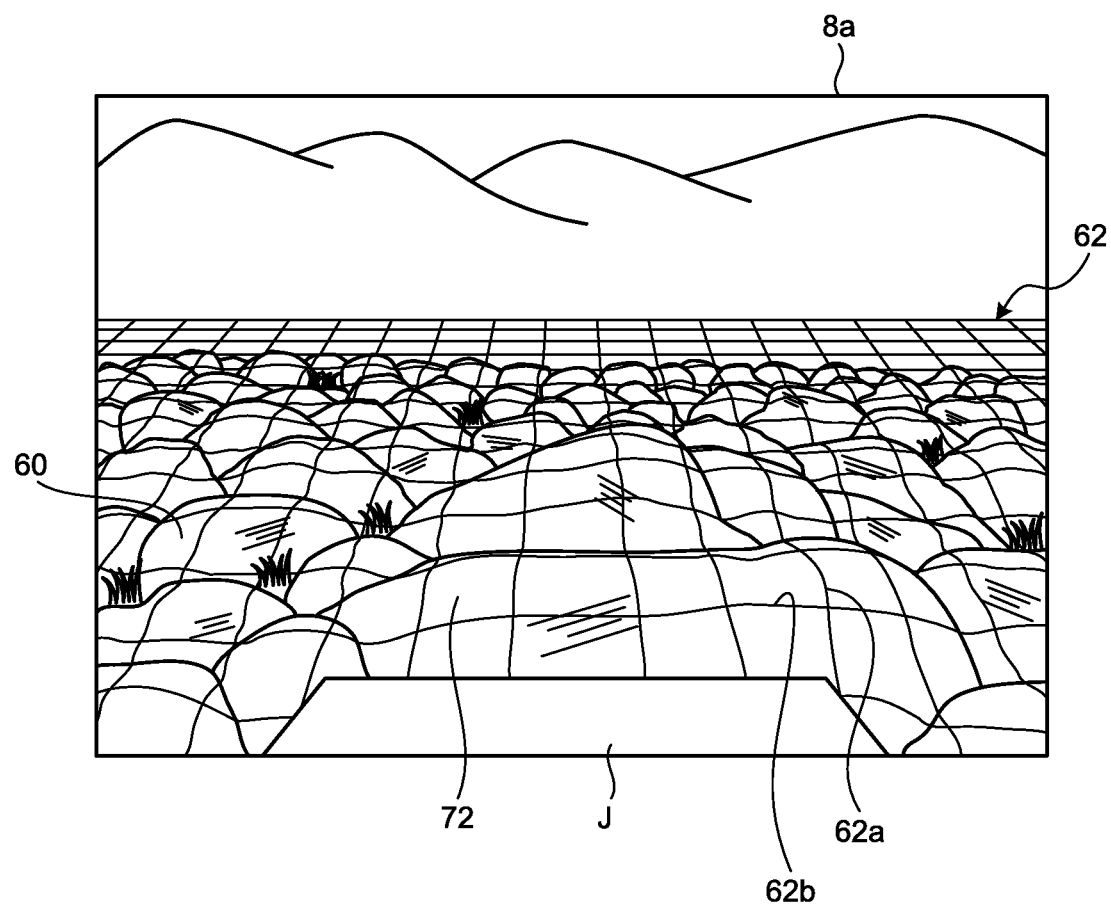
FIG. 5 is a display example for explaining an example in which a wire frame as an indicator is superimposed on a three-dimensional model image in the periphery monitoring apparatus according to the embodiments.

As illustrated in FIG. 5, the wire frame 62 is obtained by changing a shape of a flat reference wire frame including a plurality of wires arranged in a mesh shape in a direction corresponding to the three-dimensional information to visualize the three-dimensional information on a two-dimensional screen. Specifically, the reference wire frame is formed by arranging, for example, a plurality of first wires 62*a* arranged in a first direction (for example, a direction corresponding to the vehicle width direction) at regular intervals and a plurality of second wires 62*b* arranged in a second direction (for example, a direction corresponding to the vehicle longitudinal direction) that is different from the first direction so that the respective first wires 62*a* and second wires 62*b* are orthogonal to each other. For example, when an intersection point of the first wire 62*a* and the second wire 62*b* is moved in a vertical direction or a horizontal direction in accordance with the three-dimensional information, shapes of a plurality of rectangular regions 72 surrounded by the first wire 62*a* and the second wire 62*b* are deformed in accordance with the three-dimensional information. By viewing the entire wire frame 62 constituted of the deformed rectangular regions 72, the three-dimensional information is visualized on the two-dimensional screen. As illustrated in FIG. 5, by superimposing the wire frame 62 that is made three-dimensional onto the three-dimensional model image, the three-dimensional model image can be seen more stereoscopically.

The peripheral information acquisition unit 30 acquires information about the peripheral region in the traveling direction of the vehicle 1, and temporarily holds the information in the RAM 14*c* and the like, for example. In a case in which the imaging unit 15*c* disposed on the front side of the vehicle 1 is a stereo camera, the peripheral information acquisition unit 30 acquires, from the imaging unit 15*c*, the taken image data representing a peripheral image and the three-dimensional information included in an imaging region via the display control unit 14*d*. At this point, the peripheral information acquisition unit 30 acquires two two-dimensional images (taken image data) having parallax that are imaged by the stereo camera, and acquires the three-dimensional information of the imaging region based on the parallax of the two two-dimensional images. In a case in which the imaging unit 15*c* is a monocular camera and includes the laser scanner 28, the peripheral information acquisition unit 30 acquires the two-dimensional image (taken image data) from the imaging unit 15*c* via the display control unit 14*d*, and acquires three-dimensional information of a detection region in front of the vehicle 1 from the laser scanner 28 via the in-vehicle network 23. In a case of only displaying a peripheral image of the vehicle 1 on the display device 8, the display control unit 14*d* may output the taken image data taken by the imaging unit 15 as it is to the display device 8. The CPU 14*a* may cause a user to select desired display content by using an input device such as the operation input unit 10 and an operation unit 14*g*. That is, the display control unit 14*d* can display an image selected by operating the operation input unit 10 or the operation unit 14*g*. For example, the display control unit 14*d* can cause the display device 8 to display a rear image of the vehicle 1 taken by the imaging unit 15*a*, or to display a left side image taken by the imaging unit 15*d*.

The rudder angle acquisition unit 32 acquires information (a rudder angle) related to an operation state of the steering unit 4 (steering wheel) output from the rudder angle sensor 19. That is, the rudder angle acquisition unit 32 acquires a rudder angle in a direction in which the vehicle 1 is caused to travel by the driver.

Figure 6:
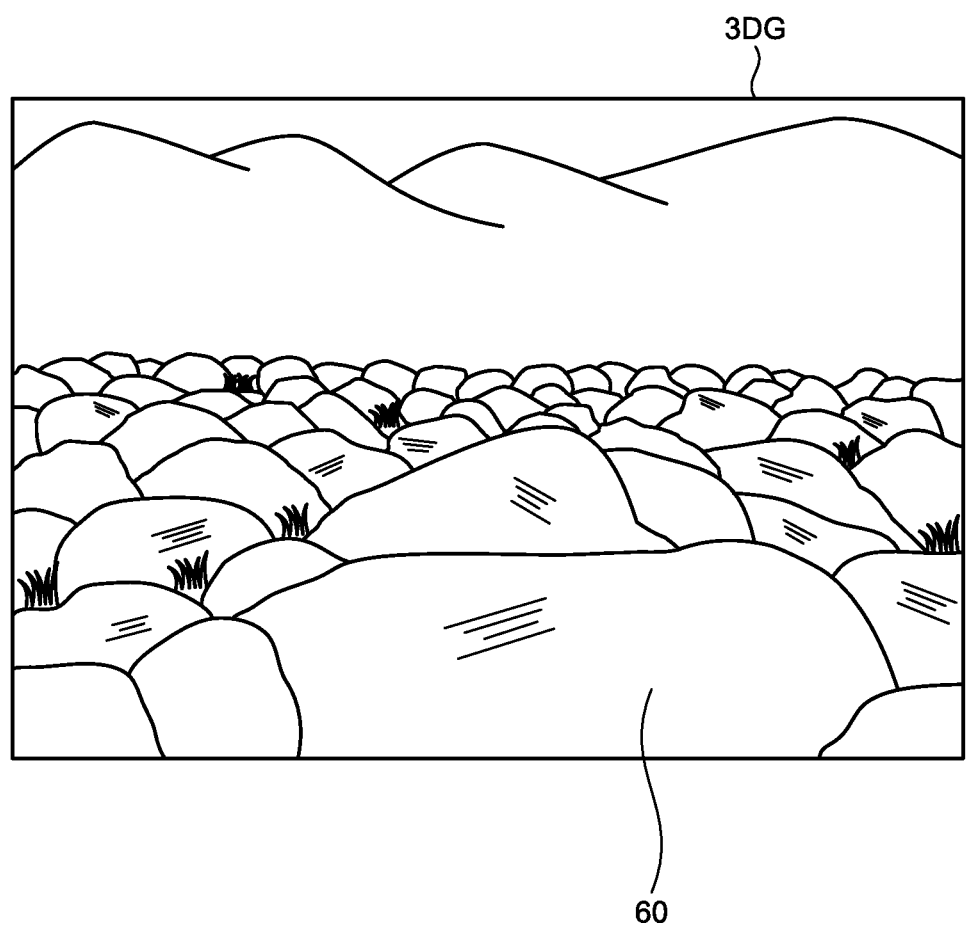
FIG. 6 is an image example for explaining an example of a three-dimensional model image on which the indicator is not superimposed in the periphery monitoring apparatus according to the embodiments.

The model image acquisition unit 34 acquires a three-dimensional model image 3DG in which the road surface 60 and the like can be seen stereoscopically as illustrated in FIG. 6 based on the taken image data and the three-dimensional information acquired by the peripheral information acquisition unit 30. In a case in which the imaging unit 15*c* is a stereo camera, the three-dimensional information acquired by the peripheral information acquisition unit 30 is applied to each region constituted of each pixel or a predetermined number of pixels in the two-dimensional image based on the taken image data taken by any one of two cameras to generate the three-dimensional model image 3DG. In this case, a distant view portion (a mountain and the like in FIG. 6) may be made three-dimensional similarly to a close-range view, but is not necessarily made three-dimensional. By limiting a region to be made three-dimensional, a calculation load can be reduced.

Figure 7:
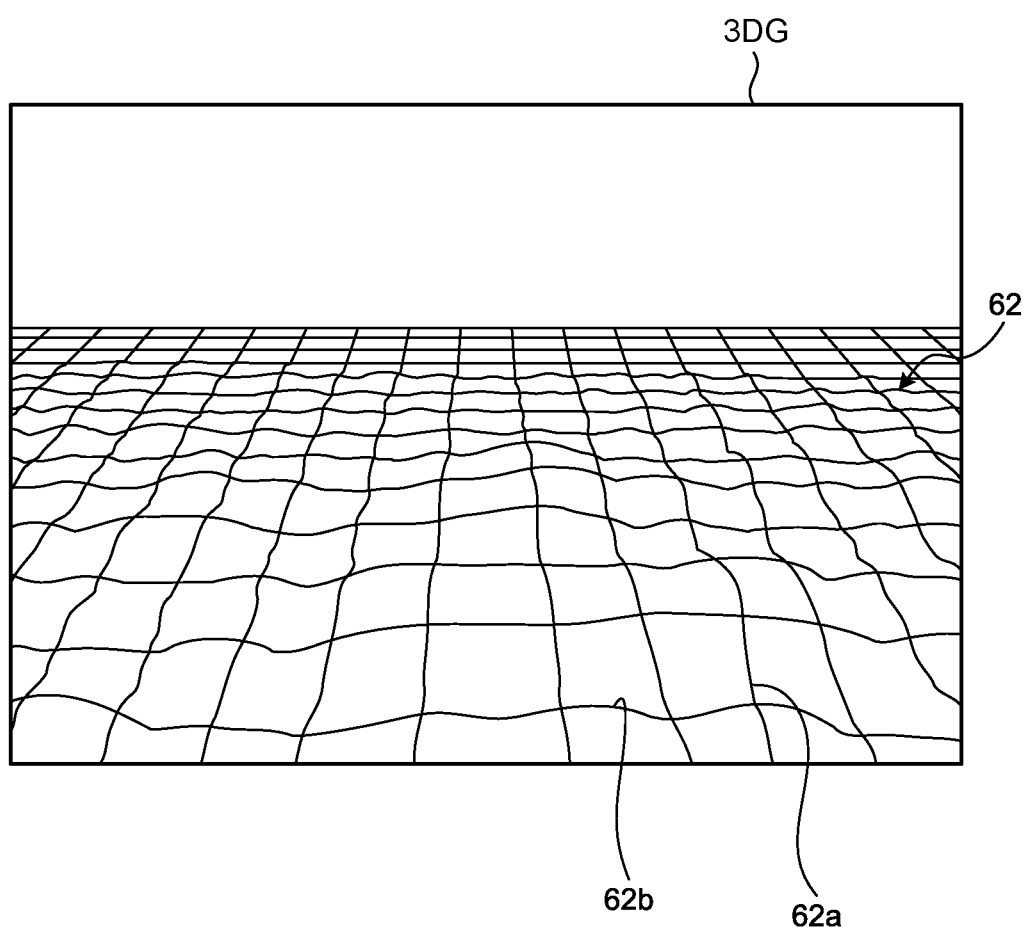
FIG. 7 is an image example for explaining an aspect of the wire frame including height information to be superimposed onto the three-dimensional model image in the periphery monitoring apparatus according to the embodiments.
Figure 8:
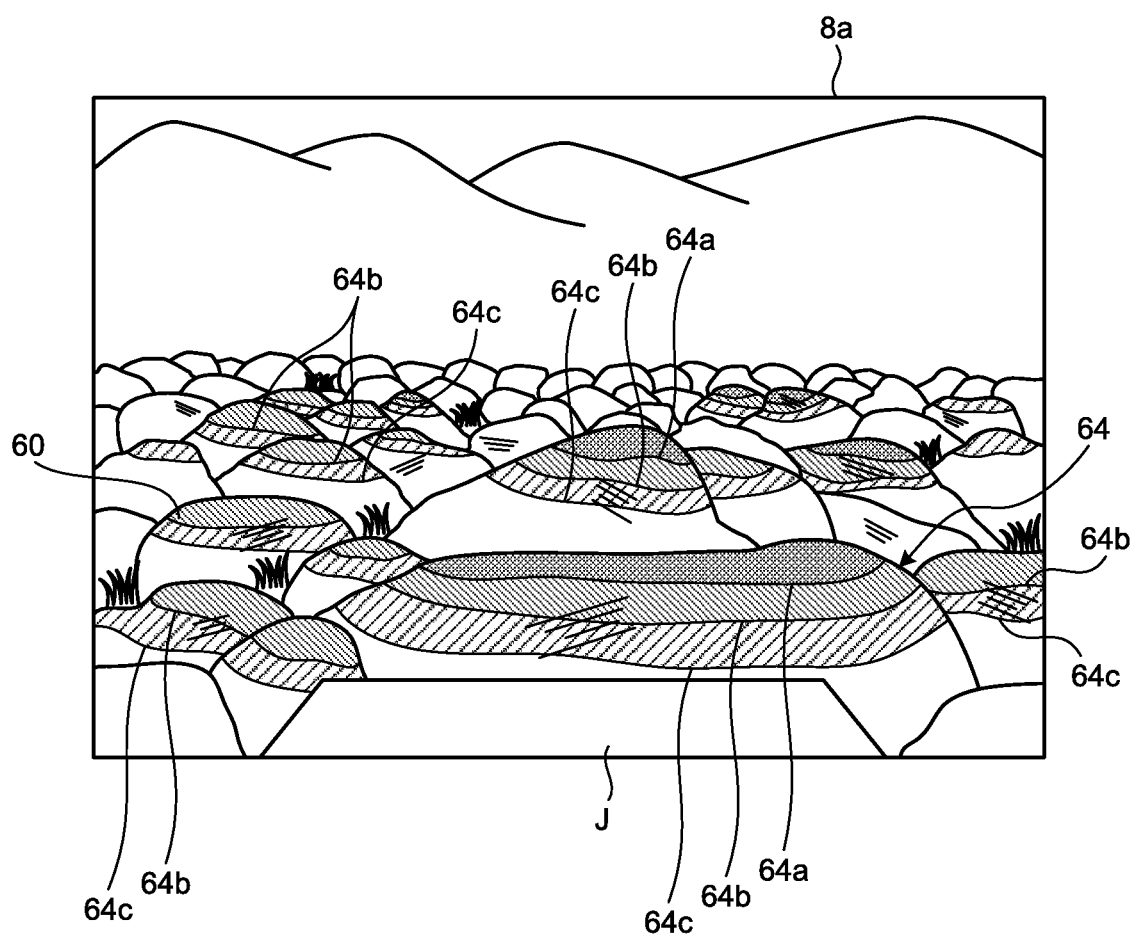
FIG. 8 is a display example in a case of superimposing, onto the three-dimensional model image, contour lines corresponding to a height of a road surface as an example of the indicator indicating the height of the road surface in the periphery monitoring apparatus according to the embodiments.
Figure 9:
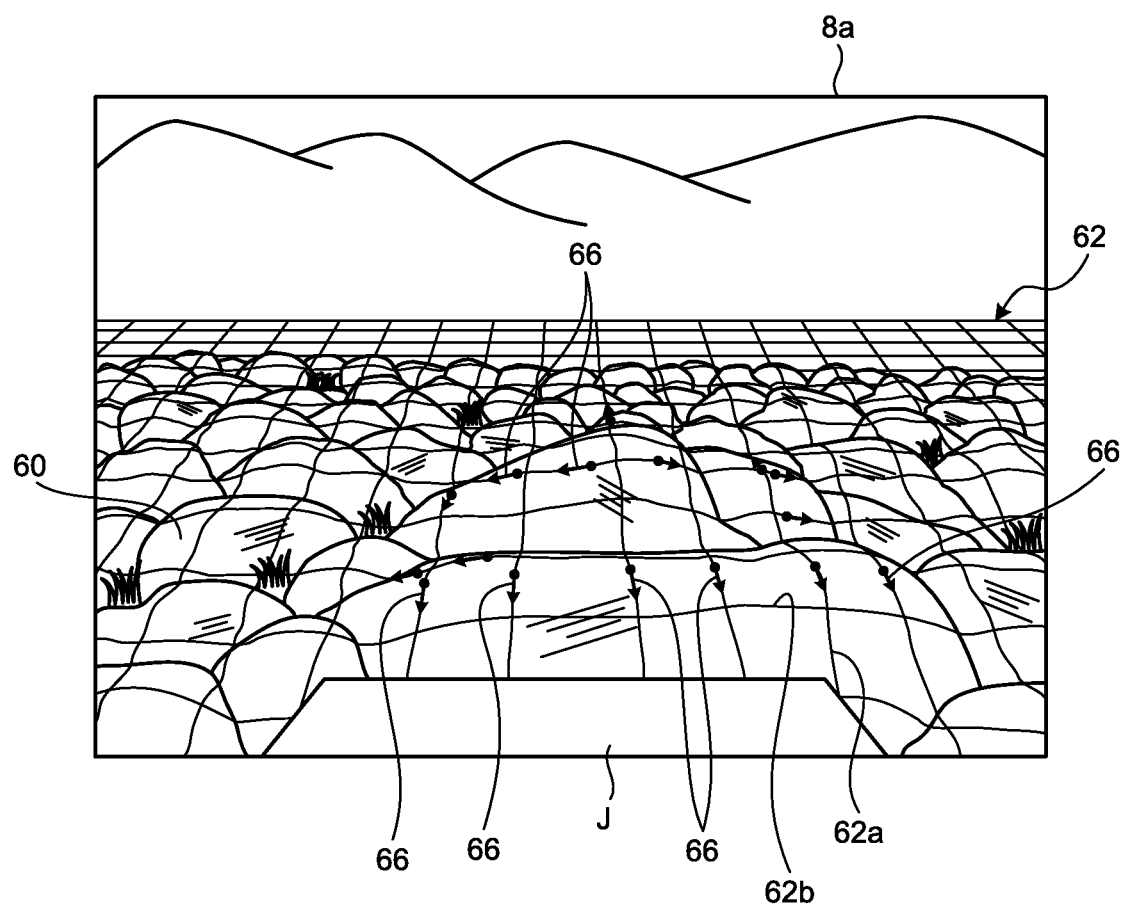
FIG. 9 is a display example of displaying a plurality of movement marks that are movable in accordance with a gradient direction in the three-dimensional model image on which the wire frame as the indicator is superimposed in the periphery monitoring apparatus according to the embodiments.
Figure 10:
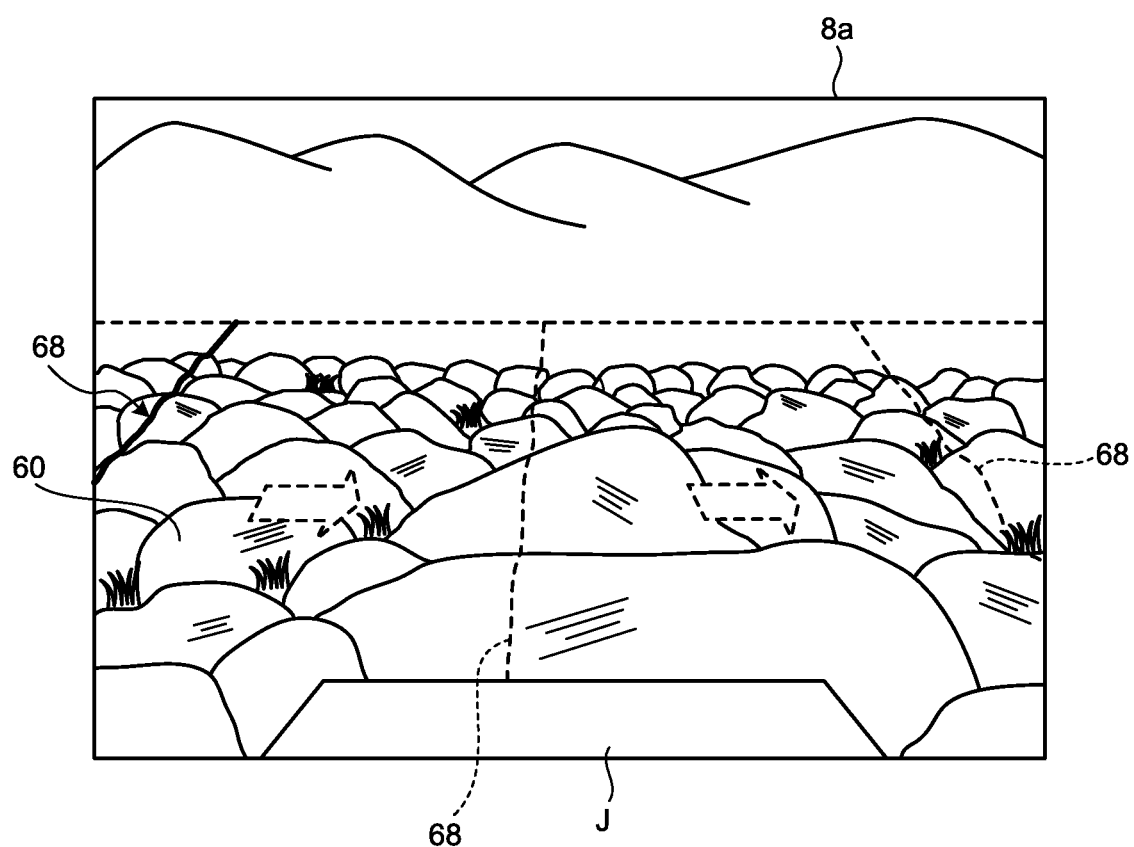
FIG. 10 is a diagram for explaining a display example of a scanning line moving in a first direction on the three-dimensional model image as the indicator in the periphery monitoring apparatus according to the embodiments.
Figure 11:
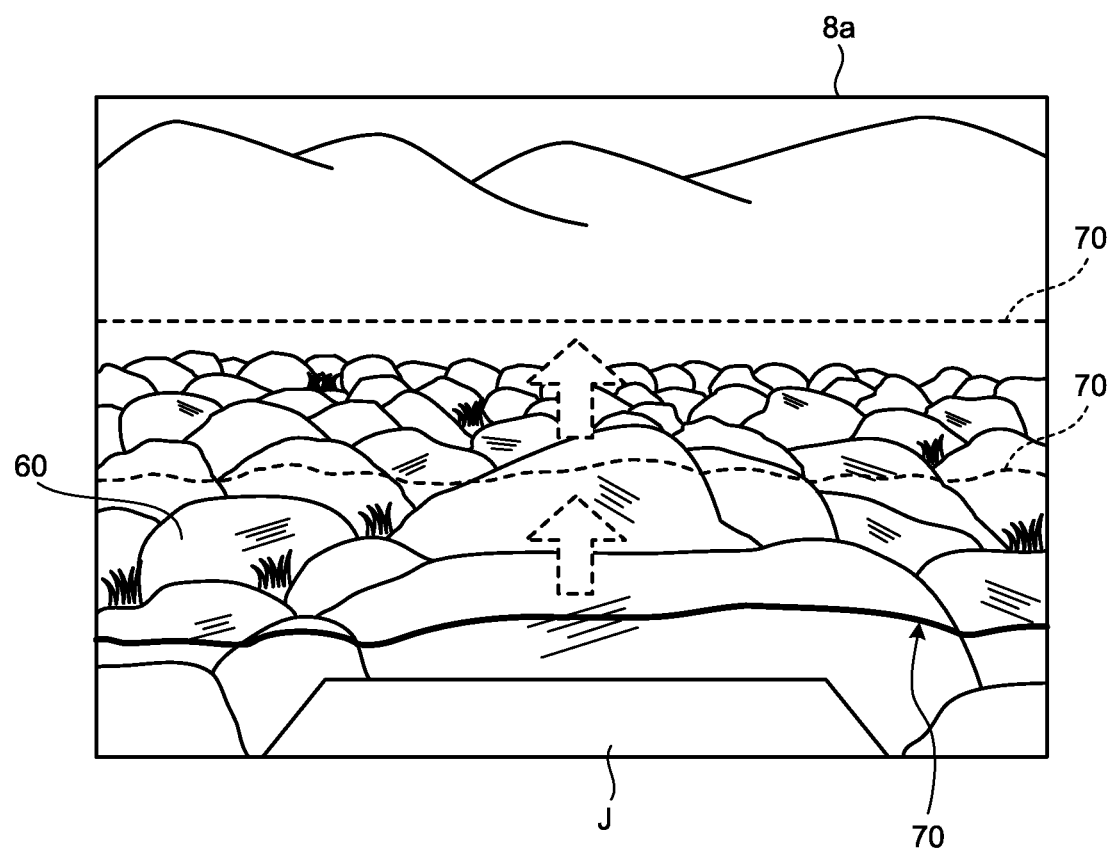
FIG. 11 is a diagram for explaining a display example of the scanning line moving in a second direction on the three-dimensional model image as the indicator in the periphery monitoring apparatus according to the embodiments.

The indicator control unit 36 acquires the indicator to be superimposed onto the three-dimensional model image 3DG generated by the model image acquisition unit 34, and sets or processes various pieces of accompanying information to be displayed together with the indicator. The indicator visualizes and displays the height of the road surface based on the height data indicating the height of the road surface for each region included in the three-dimensional model image 3DG. Examples of the indicator include the wire frame 62 constituted of the first wires 62*a* and the second wires 62*b* as illustrated in FIG. 5 and FIG. 7, and a contour line 64 connecting a plurality of positions having the same height as illustrated in FIG. 8. Examples of another indicator include a plurality of movement marks 66 that are movable in accordance with a gradient direction for each region as illustrated in FIG. 9, and a first scanning line 68 that moves in a predetermined direction, for example, a first direction on the three-dimensional model image 3DG or a second scanning line 70 that moves in a second direction different from the first direction as illustrated in FIG. 10 and FIG. 11.

In a case in which there is a request for displaying the wire frame 62 as the indicator, the wire frame acquisition unit 42 applies the three-dimensional information acquired by the peripheral information acquisition unit 30 to each intersection point at which the first wire 62*a* and the second wire 62*b* of a flat mesh-like reference wire frame intersect with other, and acquires the wire frame 62 in a three-dimensional form following the three-dimensional shape of the road surface 60 (refer to FIG. 7). In another embodiment, the wire frame 62 in a three-dimensional form may be acquired by overlapping the reference wire frame in a flat form with the three-dimensional model image 3DG acquired by the model image acquisition unit 34 and changing the shape of the reference wire frame following the three-dimensional information included in the three-dimensional model image. The superimposition unit 54 superimposes the wire frame 62 acquired by the wire frame acquisition unit 42 onto the three-dimensional model image 3DG acquired by the model image acquisition unit 34 to generate the screen 8*a* as illustrated in FIG. 5. A host vehicle image J indicating the vehicle 1 is displayed at a lower end of the screen 8*a*, so that a positional relation between the vehicle 1 (host vehicle) and an irregular portion of the road surface 60 can be easily recognized.

In a case in which there is a request for displaying the contour line 64 as the indicator, the contour line acquisition unit 44 connects positions indicated by the same height information or positions belonging to the same height range based on the three-dimensional information acquired by the peripheral information acquisition unit 30, and acquires a plurality of contour lines 64 as illustrated in FIG. 8. In a case of FIG. 8, as the contour lines 64, contour lines 64a, 64b, and 64c are formed corresponding to the height of the road surface 60. The superimposition unit 54 superimposes the contour lines 64 acquired by the contour line acquisition unit 44 onto the three-dimensional model image 3DG acquired by the model image acquisition unit 34 to generate the screen 8a as illustrated in FIG. 8. The superimposition unit 54 may only superimpose the contour lines 64 onto the three-dimensional model image 3DG, but the display mode setting unit 50 may vary a display mode for each of the contour lines 64a, 64b, and 64c to recognize variation in height more clearly. For example, the contour lines 64a, 64b, and 64c may be displayed in different colors such as "red", "yellow", "green", and the like corresponding to the height. As illustrated in FIG. 8, regions surrounded by the contour lines 64a, 64b, and 64c may be colored. For example, a region higher than the contour line 64a is displayed in "red", a region between the contour line 64a and the contour line 64b is displayed in "yellow", and a region between the contour line 64b and the contour line 64c is displayed in "green". In this way, in a case of coloring the region, visibility of content of the three-dimensional model image 3DG can be secured by setting transmittance of the region to be high. Also in a case of FIG. 8, the host vehicle image J indicating the vehicle 1 is displayed at the lower end of the screen 8a, so that a positional relation between the vehicle 1 (host vehicle) and the irregular portion of the road surface 60 can be easily recognized.

In a case in which there is a request for displaying the movement mark 66 as the indicator, the movement mark setting unit 46 sets the movement marks 66 that are movable in accordance with a gradient direction of each region set in the three-dimensional model image 3DG acquired by the model image acquisition unit 34 based on the three-dimensional information acquired by the peripheral information acquisition unit 30. The movement mark 66 moves from a position indicating a high position to a lower position as the three-dimensional information. For example, in a case in which the three-dimensional information includes the height information for each pixel constituting the three-dimensional model image 3DG, the height information is successively compared between adjacent pixels, and the movement mark 66 that moves in a direction toward a lower height is set. In a case in which the three-dimensional information includes the height information for each region defined with a plurality of pixels constituting the three-dimensional model image 3DG, the height information is successively compared between adjacent regions, and the movement mark 66 that moves in a direction toward a lower height is set. The superimposition unit 54 superimposes the movement mark 66 acquired by the movement mark setting unit 46 onto the three-dimensional model image 3DG acquired by the model image acquisition unit 34 to generate the screen 8a as illustrated in FIG. 9. Also in a case of FIG. 9, the host vehicle image J indicating the vehicle 1 is displayed at the lower end of the screen 8a, so that a positional relation between the vehicle 1 (host vehicle) and the irregular portion of the road surface 60 can be easily recognized.

By way of example, FIG. 9 illustrates an example in which the movement mark 66 moves along the wire frame 62 acquired by the wire frame acquisition unit 42. In this case, the height information included in the three-dimensional information is reflected in the intersection point of the first wire 62a and the second wire 62b of the wire frame 62, so that the movement mark setting unit 46 sets a moving direction of the movement mark 66 by comparing the height information between the respective intersection points of the wire frame 62. In a case of FIG. 9, the movement mark 66 has a circular shape including an arrow to clarify the moving direction, and is displayed to always move toward a lower direction, so that a dynamic change thereof can be easily recognized. Thus, the movement mark 66 may be constituted of only a mark having a circular shape or another shape without an arrow and the like. In this way, the movement mark 66 can dynamically represent that the height of the road surface 60 is higher in a portion having a longer moving distance than in a portion having a shorter moving distance. By displaying, at regular intervals, the movement marks 66 so that each of the movement marks 66 follows the movement mark 66 moving ahead, the movement mark 66 can be seen as if "particles" are flowing, and the shape and the height of the road surface 60 can be expressed more clearly. The moving speed of the movement mark 66 may be varied in accordance with a gradient state for each region. For example, the moving speed may be increased as the gradient is steeper. By varying the moving speed of the movement mark 66 in accordance with the gradient state of the road surface 60, a portion in which ruggedness of the road surface 60 varies can be displayed more clearly, and the shape of the road surface 60 can be grasped more intuitively. FIG. 9 illustrates an example in which the movement mark 66 moves on the first wires 62a and the second wires 62b of the wire frame 62, but the wire frame 62 is not necessarily displayed in another embodiment. In this case, the movement mark 66 is displayed on the three-dimensional model image 3DG such that water runs down from a higher portion toward a lower portion, for example, so that the shape of the road surface 60 can be made more distinctive, and the rugged state of the road surface 60 can be easily recognized.

In a case in which there is a request for displaying the first scanning line 68 or the second scanning line 70 as the indicator, the scanning line setting unit 48 sets the first scanning line 68 that moves in a predetermined direction, for example, the first direction, or the second scanning line 70 that moves in the second direction different from the first direction on the three-dimensional model image 3DG based on the three-dimensional information acquired by the peripheral information acquisition unit 30.

The first scanning line 68 is a line that moves at predetermined speed in the first direction, for example, the vehicle width direction of the vehicle 1 on the three-dimensional model image 3DG acquired by the model image acquisition unit 34. FIG. 10 illustrates an example of the first scanning line 68 in which one first scanning line 68 moves, for example, from the left end toward the right end of the screen 8a. The first scanning line 68 may be a line corresponding to one of the first wires 62a of the wire frame 62 acquired by the wire frame acquisition unit 42. The shape of the first scanning line 68 is determined to follow the irregular shape of the road surface 60 corresponding to a scanning position in the first direction based on the three-dimensional information acquired by the peripheral information acquisition unit 30. The superimposition unit 54 superimposes the first scanning line 68 acquired by the scanning line setting unit 48 onto the three-dimensional model image 3DG acquired by the model image acquisition unit 34 to generate the screen 8a as illustrated in FIG. 10. That is, the first scanning line 68 moves from the left end toward the right end of the screen 8a while changing the shape thereof to follow irregularities of the road surface 60. The first scanning line 68 that has moved to the right end is temporarily hidden, and displayed at the left end again to start to move toward the right end. The moving direction of the first scanning line 68 may be reversed. Also in a case of FIG. 10, the host vehicle image J indicating the vehicle 1 is displayed at the lower end of the screen 8a, so that a positional relation between the vehicle 1 (host vehicle) and the irregular portion of the road surface 60 can be easily recognized.

The second scanning line 70 is a line that moves at predetermined speed in the second direction different from the first direction, for example, the longitudinal direction of the vehicle 1 on the three-dimensional model image 3DG acquired by the model image acquisition unit 34. FIG. 11 illustrates an example of the second scanning line 70 in which one second scanning line 70 moves, for example, from a lower end toward an upper end of the screen 8a. The second scanning line 70 may be a line corresponding to one of the second wires 62b of the wire frame 62 acquired by the wire frame acquisition unit 42. The shape of the second scanning line 70 is determined to follow the irregular shape of the road surface 60 corresponding to a scanning position in the second direction based on the three-dimensional information acquired by the peripheral information acquisition unit 30. The superimposition unit 54 superimposes the second scanning line 70 acquired by the scanning line setting unit 48 onto the three-dimensional model image 3DG acquired by the model image acquisition unit 34 to generate the screen 8a as illustrated in FIG. 11. That is, the second scanning line 70 moves from the lower end toward the upper end of the screen 8a while changing the shape thereof to follow irregularities of the road surface 60. The second scanning line 70 that has moved to the upper end is temporarily hidden, and displayed at the lower end again to start to move toward the upper end. The moving direction of the second scanning line 70 may be reversed. Also in a case of FIG. 11, the host vehicle image J indicating the vehicle 1 is displayed at the lower end of the screen 8a, so that a positional relation between the vehicle 1 (host vehicle) and the irregular portion of the road surface 60 can be easily recognized.

The number of first scanning lines 68 and second scanning lines 70 to be displayed while they are moving may be one, or may be plural, for example, three, the plural scanning lines to be displayed at predetermined intervals. In this case, the three first scanning lines 68 (second scanning lines 70) move in the first direction (second direction) while maintaining the predetermined intervals. In this way, by displaying a small number of (for example, one to three) first scanning lines 68 (second scanning lines 70), the irregular shape of the road surface 60 in a portion in which the first scanning line 68 (second scanning line 70) is displayed can be grasped without deteriorating visibility of the three-dimensional model image 3DG. The first scanning line 68 (second scanning line 70) may be displayed while leaving a residual image. In this case, to ensure the visibility of the three-dimensional model image 3DG, the number of the first scanning lines 68 (second scanning lines 70) to be displayed is preferably small, for example, one. By displaying the first scanning line 68 (second scanning line 70) while leaving a residual image, a range that specifically indicates the irregular state of the road surface 60 is widened, and the shape of the road surface 60 can be grasped more easily. As another embodiment, scanning speed of the first scanning line 68 (second scanning line 70) may be increased or reduced in accordance with the state of the road surface 60. For example, in a case in which the height of the road surface 60 relative to a current position of the vehicle 1 is equal to or larger than a predetermined value, the scanning speed of the first scanning line 68 (second scanning line 70) is reduced as compared with that in a case in which the height of the road surface 60 is smaller than the predetermined value. In contrast, in a case in which the height of the road surface 60 is smaller than the predetermined value, the scanning speed of the first scanning line 68 (second scanning line 70) is increased as compared with that in a case in which the height of the road surface 60 is equal to or larger than the predetermined value. In this way, by varying the scanning speed, the shape of a portion of the road surface 60 requiring attention can be recognized more easily.

In a case of superimposing the indicator onto the three-dimensional model image 3DG to be displayed, the display mode setting unit 50 sets a display mode thereof. For example, the display mode setting unit 50 determines a display color, a display range, and the like of the indicator, or determines the display mode for improving an attention degree of the indicator. For example, the display color or luminance of the indicator can be varied, or the indicator can be displayed with blinking in accordance with the height of the road surface 60.

Figure 12:
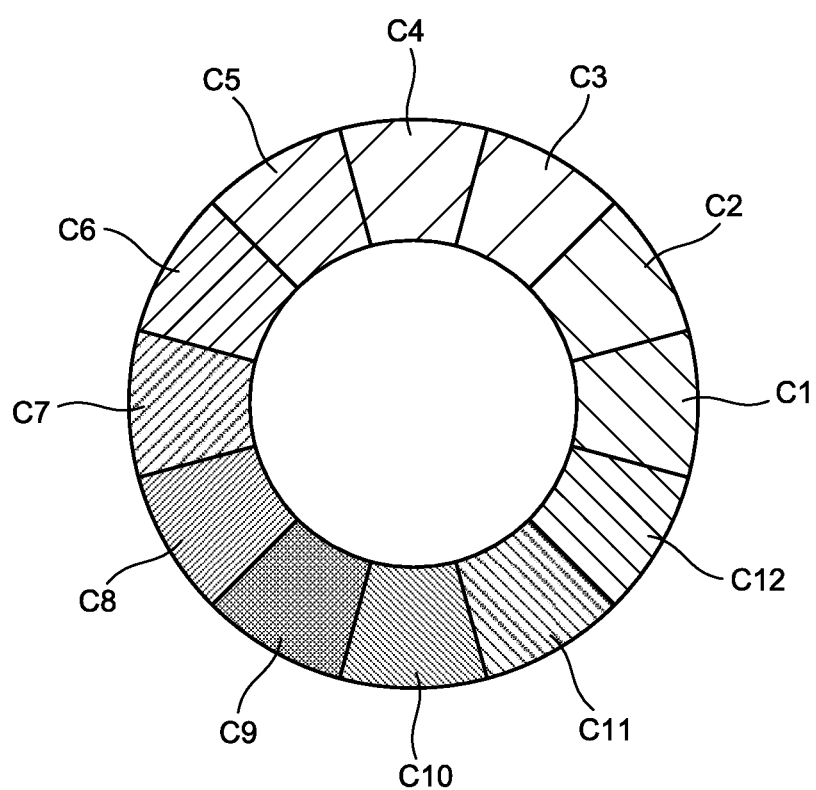
FIG. 12 is a diagram illustrating an example of a hue circle corresponding to data to be referred to in a case of determining a display color of the indicator in the periphery monitoring apparatus according to the embodiments.

For example, to improve a discrimination property between the display color (the color of the road surface 60) of the three-dimensional model image 3DG and the display color of the indicator to be superimposed thereon, the display mode setting unit 50 determines the display color of the indicator in accordance with the color of the road surface 60 at a position on which the indicator is superimposed. For example, the ROM 14b holds data corresponding to a hue circle as illustrated in FIG. 12. The display mode setting unit 50 sets the display color of the indicator to be a complementary color of the color of the road surface 60 based on color information of the taken image data of the road surface 60 acquired by the peripheral information acquisition unit 30. By way of example, FIG. 12 illustrates a hue circle of RGB type indicating a hue divided into twelve equal parts of "C1" to "C12". For example, in a case in which the color of a portion on which the indicator is superimposed on the road surface 60 corresponds to a reference numeral "C6" in the drawing, the display mode setting unit 50 sets the display color of the indicator to be a color of "C12". In this way, when the display color of the indicator is a complementary color of the color of the road surface 60, for example, even the indicator represented by a thin line such as the wire frame 62, the first scanning line 68, and the second scanning line 70, or the indicator displayed in a form of a particle such as the movement mark 66 can be easily discriminated from the road surface 60, and the irregular shape of the road surface 60 can be easily recognized. The hue circle illustrated in FIG. 12 is merely an example, and the hue circle may be a Munsell type or an RYB type. The color of the road surface 60 irregularly and successively varies, so that the display color of the indicator also varies in accordance with the color of the road surface 60 on which the indicator is superimposed. Thus, for example, in a case of the wire frame 62, the first wire 62a (second wire 62b) constituting the wire frame 62 does not have a single color, and the display color partially varies in one first wire 62a (second wire 62b). However, in a case of viewing the entire wire frame 62 superimposed on the three-dimensional model image 3DG, the color thereof can be easily discriminated from the display color of the three-dimensional model image 3DG, the first wire 62a and the second wire 62b can be easily recognized, and the irregular shape following the road surface 60 can be easily recognized. Similarly, also in a case of displaying the first scanning line 68 or the second scanning line 70 as the indicator, the display mode setting unit 50 determines the display color of the first scanning line 68 or the second scanning line 70 to be the complementary color of the display color of the three-dimensional model image 3DG corresponding to the scanning position, and can exhibit an effect of improving the discrimination property similarly to the case of displaying the wire frame 62.

Similarly, also in a case of displaying the movement mark 66 as the indicator, the display mode setting unit 50 determines the display color of the movement mark 66 to be moved to be the complementary color of the display color of the three-dimensional model image 3DG at a position to which the movement mark 66 moves. The movement mark 66 also moves on the three-dimensional model image 3DG while varying the display color thereof. As a result, the display color of the movement mark 66 can be easily discriminated from the display color of the three-dimensional model image 3DG, so that the movement mark 66 can be easily recognized, and variation in the rugged state of the road surface 60 can be easily recognized.

Figure 13:
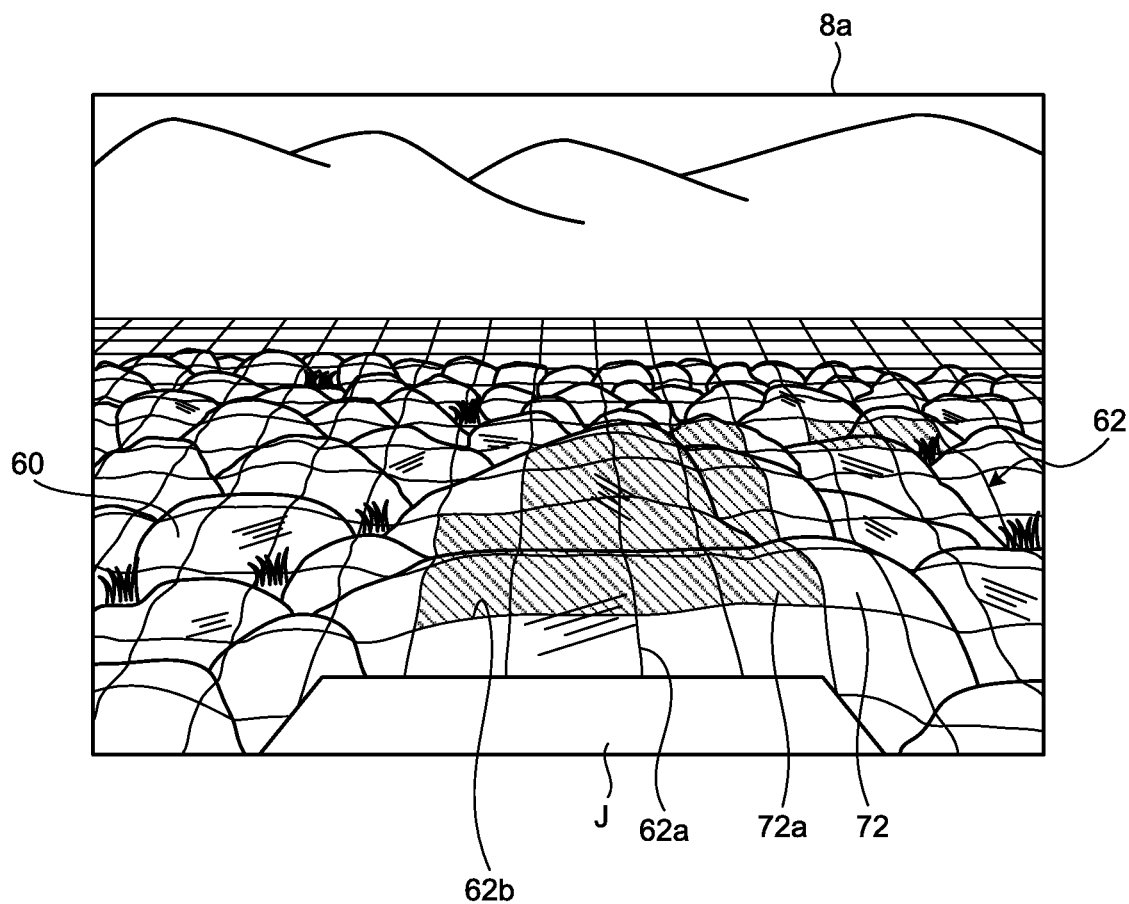
FIG. 13 is a diagram illustrating a display example in which a display mode of the indicator is varied in accordance with the height of the road surface in the periphery monitoring apparatus according to the embodiments, and an example of varying a display color of a region having a height exceeding a predetermined height among regions surrounded by the wire frame.

The display mode setting unit 50 may vary the display mode of the indicator to emphasize a portion requiring attention on the three-dimensional model image 3DG. For example, as illustrated in FIG. 13, the display mode of a region having a height equal to or larger than a predetermined threshold is varied with respect to a position at which the vehicle 1 (host vehicle) is currently present. In a case of FIG. 13, for example, to clarify the position on the road surface 60 having a height difference larger than a vehicle height value of the vehicle 1, a region 72a including a portion having a height difference requiring attention (a region including a portion having a height equal to or larger than the predetermined threshold) is colored among the regions 72 surrounded by the first wire 62a and the second wire 62b of the wire frame 62. In a case of coloring the region 72a, the region 72a may be colored with a color for calling attention, "red" for example, and transmittance thereof may be increased to prevent state recognition of the road surface 60 on the three-dimensional model image 3DG from being hindered. In another embodiment, in contrast, the transmittance of the colored region 72a may be reduced to emphasize that the region is impassable. In this way, by displaying the indicator (wire frame 62) for emphasizing the irregular (rugged) state of the road surface 60 and varying the display mode of the portion requiring special attention, the irregular (rugged) state of the road surface 60 can be recognized more intuitively. Also in a case of FIG. 13, the host vehicle image J indicating the vehicle 1 is displayed at the lower end of the screen 8a, so that a positional relation between the vehicle 1 (host vehicle) and the irregular portion of the road surface 60, and a positional relation between the vehicle 1 (host vehicle) and the region 72a to be noticed can be easily recognized.

Figure 14:
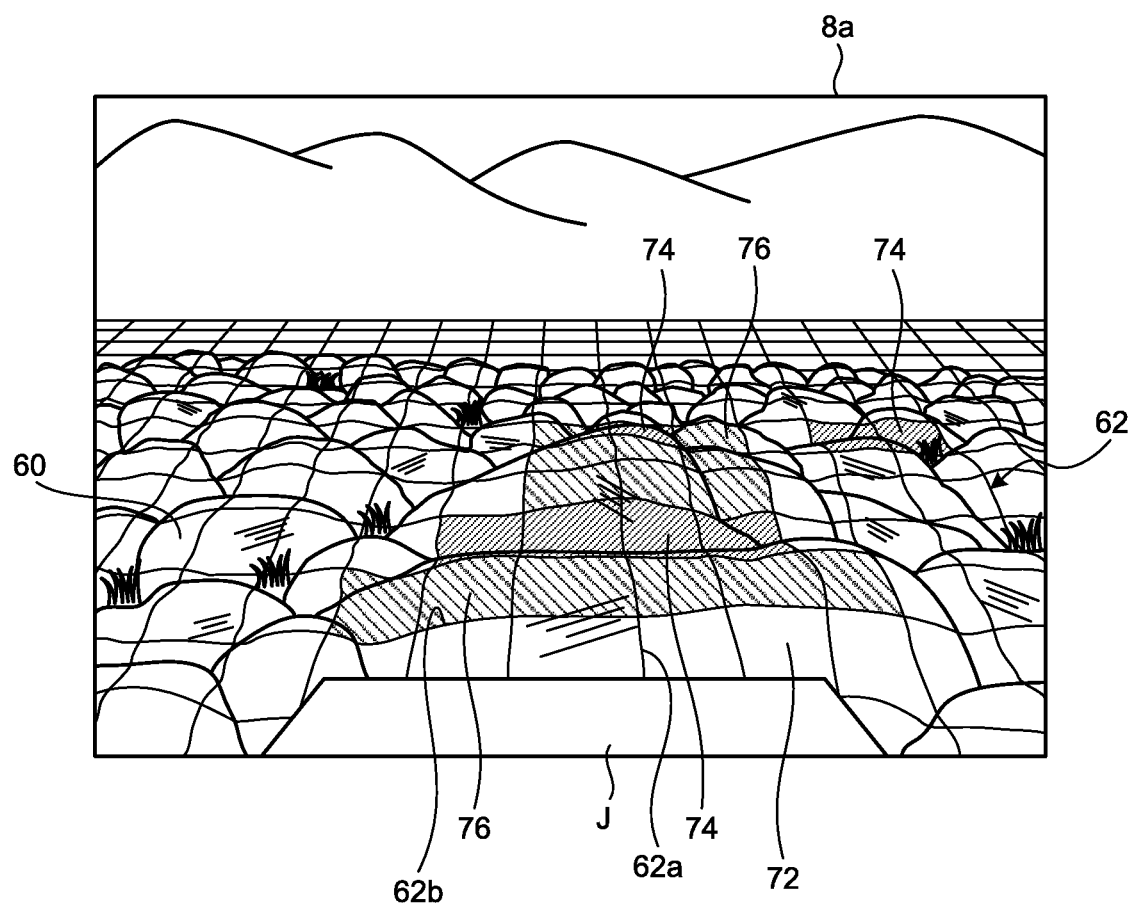
FIG. 14 is a diagram illustrating a display example in which the display mode of the indicator is varied in accordance with the height of the road surface in the periphery monitoring apparatus according to the embodiments, and illustrating a case of varying the display color of the region surrounded by the wire frame for each height of the road surface.

Similarly, in a case of FIG. 14, for example, the display mode setting unit 50 varies the display mode of the region in stages in accordance with the height of the road surface 60 with respect to the position at which the vehicle 1 (host vehicle) is currently present. For example, the display mode setting unit 50 displays a first region 74 for calling "large" attention and a second region 76 for calling "middle" attention in different display colors, for example, among the regions 72 surrounded by the first wire 62a and the second wire 62b of the wire frame 62. In this way, by displaying the regions in a plurality of display modes in accordance with the height of irregularities (ruggedness) of the road surface 60, the irregular (rugged) state of the road surface 60 can be recognized more intuitively. Also in a case of FIG. 14, the host vehicle image J indicating the vehicle 1 is displayed at the lower end of the screen 8a, so that a positional relation between the vehicle 1 (host vehicle) and the irregular portion of the road surface 60 and a positional relation between the vehicle 1 (host vehicle) and the region 72a to be noticed can be easily recognized. In a case of FIG. 14, the region for calling attention is represented in two levels, but the embodiment is not limited thereto. For example, the region for calling attention may be represented in three or more levels. In the examples of FIG. 13 and FIG. 14, regarding the portion where the display mode is varied, the display mode setting unit 50 may vary not only the display color but also luminance of the region 72a, the first region 74, or the second region 76 to be emphasized. Similarly, the display mode setting unit 50 may cause the region 72a, the first region 74, or the second region 76 to blink to be emphasized.

In a case of displaying the wire frame 62 as the indicator, the display mode setting unit 50 may set the wire frame 62 to be displayed in only a required portion on the three-dimensional model image 3DG.

Figure 15:
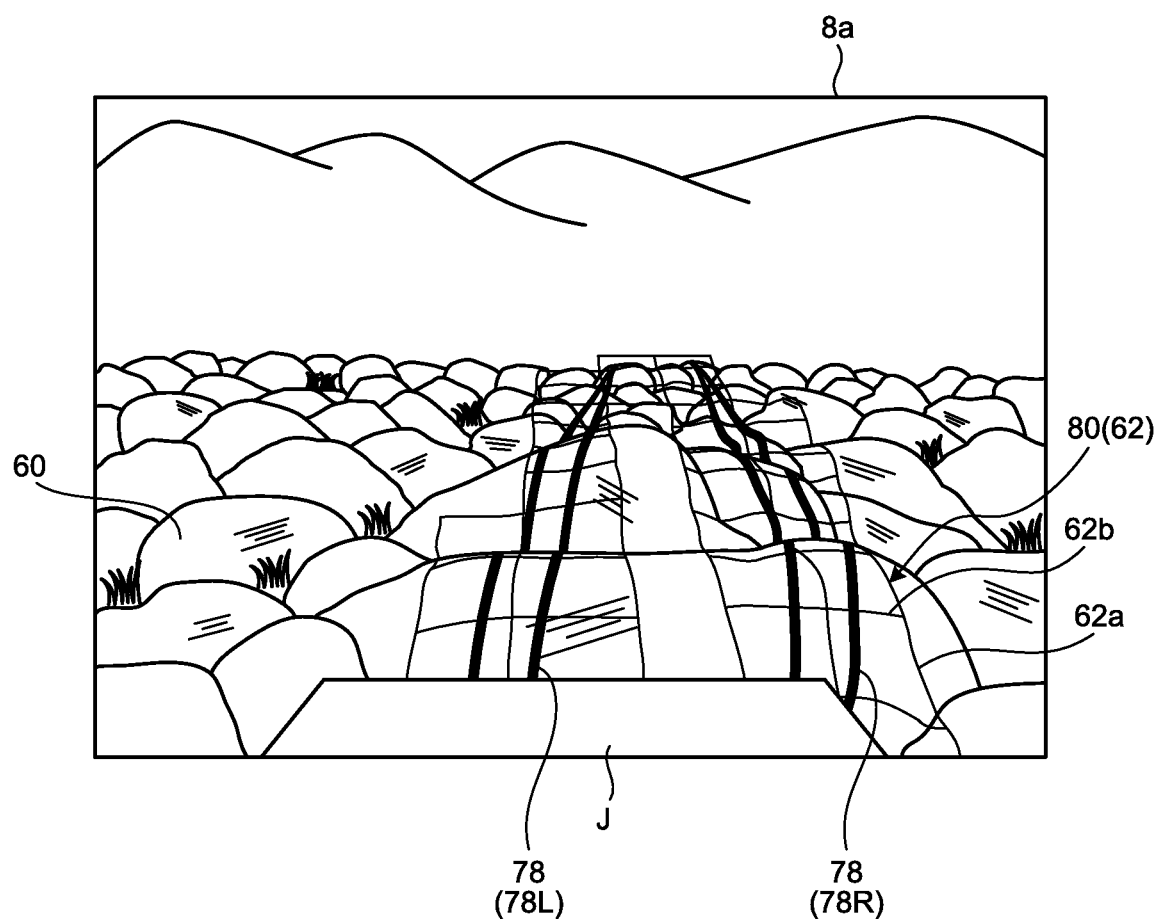
FIG. 15 is a display example illustrating an example of superimposing the indicator indicating the height of the road surface with the wire frame onto only a display portion of a route indicator in a case of displaying the route indicator in the periphery monitoring apparatus according to the embodiments.

For example, as illustrated in FIG. 15, in a case in which the ECU 14 receives a request for displaying a tire route line 78 (a tire route line 78L for the left front wheel 3F and a tire route line 78R for the right front wheel 3F) extending in a direction in which the front wheel 3F faces as the route indicator, the route indicator acquisition unit 52 acquires the tire route line 78 based on rudder angle information acquired by the rudder angle acquisition unit 32. The display mode setting unit 50 sets a wire frame 80 for a region on which the tire route line 78 is superimposed on the three-dimensional model image 3DG. The superimposition unit 54 superimposes the tire route line 78 acquired by the route indicator acquisition unit 52 and the wire frame 80 set by the display mode setting unit 50 onto the three-dimensional model image 3DG acquired by the model image acquisition unit 34 to generate the screen 8a as illustrated in FIG. 15. In this case, the display mode setting unit 50 can cut out a portion corresponding to the tire route line 78 from the wire frame 62 acquired by the wire frame acquisition unit 42 to be displayed as the wire frame 80. In a case in which the user changes the rudder angle by operating the steering unit 4, the route indicator acquisition unit 52 acquires the tire route line 78 corresponding to the changed direction. As a result, the display mode setting unit 50 cuts out, from the wire frame 62, the wire frame 80 corresponding to a superimposed position of the tire route line 78 to be displayed. In this way, by displaying the tire route line 78 and the wire frame 80 of a portion corresponding to the tire route line 78, display content of the entire screen 8a can be simplified to improve the visibility of the screen 8a, and the irregular shape of the road surface 60 in a direction in which the vehicle 1 may travel can be clarified. As a result, the user can intuitively understand the state of the portion of the road surface 60 required for causing the vehicle 1 to travel. In a case of FIG. 15, the host vehicle image J indicating the vehicle 1 is displayed at the lower end of the screen 8a, so that a positional relation between the vehicle 1 (host vehicle) and the irregular portion of the road surface 60, and a relation between the vehicle 1 (host vehicle) and the tire route line 78 can be easily recognized.

FIG. 15 illustrates an example of displaying the tire route line 78 in the display mode to follow the irregular state of the road surface 60. In this way, by displaying the tire route line 78 in the display mode to follow the irregular state of the road surface 60, the irregular shape of the road surface 60 can be made more distinctive due to the shape of the tire route line 78, and the irregular shape of the road surface 60 can be recognized more easily due to a synergistic effect of the shape of the tire route line 78 and display of the wire frame 80. In another embodiment, the tire route line 78 may be displayed by a straight line irrespective of the irregular state of the road surface 60. In this case, the irregular shape of the road surface 60 can be easily recognized due to the wire frame 80, and a load of calculation processing for display can be reduced by simply displaying the tire route line 78. In yet another embodiment, the wire frame acquisition unit 42 may acquire the wire frame 62 (80) to be displayed only for a portion on which the tire route line 78 is superimposed. As described above with reference to FIG. 13 and FIG. 14, the display mode setting unit 50 may color part of the wire frame 80, vary luminance thereof, and display part of the wire frame 80 with blinking in accordance with the height of the road surface 60 to call attention.

Figure 16:
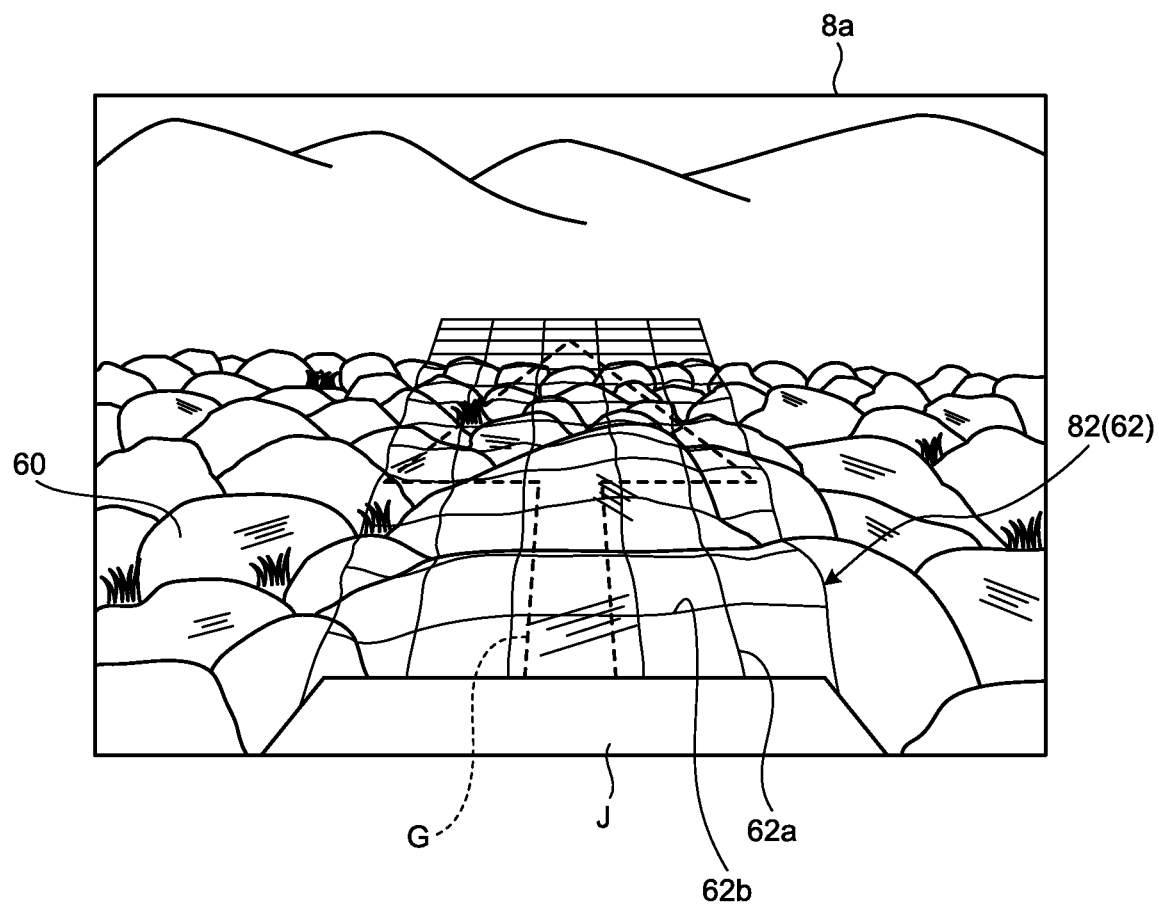
FIG. 16 is a display example illustrating an example of superimposing the indicator indicating the height of the road surface with the wire frame onto only a region in a route direction of the vehicle in the periphery monitoring apparatus according to the embodiments.

As illustrated in FIG. 16, the route indicator acquisition unit 52 can acquire, as the route indicator, a recommended route G by which the vehicle 1 can easily travel. In this case, the route indicator acquisition unit 52 calculates the recommended route G based on the three-dimensional information acquired by the peripheral information acquisition unit 30 so that the number of times of inclination equal to or larger than a predetermined angle and the number of times of shaking of the vehicle 1 become minimum in a case of causing the vehicle 1 to travel, for example. The display mode setting unit 50 sets a wire frame 82 in a direction indicated by the recommended route G. The superimposition unit 54 superimposes the wire frame 82 set by the display mode setting unit 50 onto the three-dimensional model image 3DG acquired by the model image acquisition unit 34 to generate the screen 8a as illustrated in FIG. 16. FIG. 16 illustrates an example in which the display mode setting unit 50 cuts out, from the wire frame 62 acquired by the wire frame acquisition unit 42, the wire frame 82 to be displayed, the wire frame 82 having a width equivalent to or slightly larger than the vehicle width of the vehicle 1 (host vehicle image J). In this way, by displaying the wire frame 82 in the direction indicated by the recommended route G, display content of the entire screen 8a can be simplified to improve the visibility of the screen 8a, and the irregular shape of the road surface 60 in a direction in which the vehicle 1 may travel can be clarified. As a result, the user can intuitively understand the state of the portion of the road surface 60 required for causing the vehicle 1 to travel. In a case of FIG. 16, by way of example, the recommended route G indicates a straight advancing direction, but in a case in which the recommended route G is curved in a left direction or a right direction, the wire frame 80 is also displayed in a curved form to follow the direction. In a case of FIG. 16, the host vehicle image J indicating the vehicle 1 is displayed at the lower end of the screen 8a, so that a positional relation between the vehicle 1 (host vehicle) and the irregular portion of the road surface 60, and a relation between the vehicle 1 (host vehicle) and the recommended route G can be easily recognized. In another embodiment, the wire frame acquisition unit 42 may acquire the wire frame 62 (wire frame 82) to be displayed for only a region corresponding to the vehicle width in the direction indicated by the recommended route G. As described above with reference to FIG. 13 and FIG. 14, the display mode setting unit 50 may color part of the wire frame 82, vary luminance thereof, and display part of the wire frame 82 with blinking in accordance with the height of the road surface 60 to call attention. The display mode setting unit 50 may set the wire frame 82 extending forward from the vehicle 1 irrespective of whether the recommended route G for the vehicle 1 is acquired.

Figure 17:
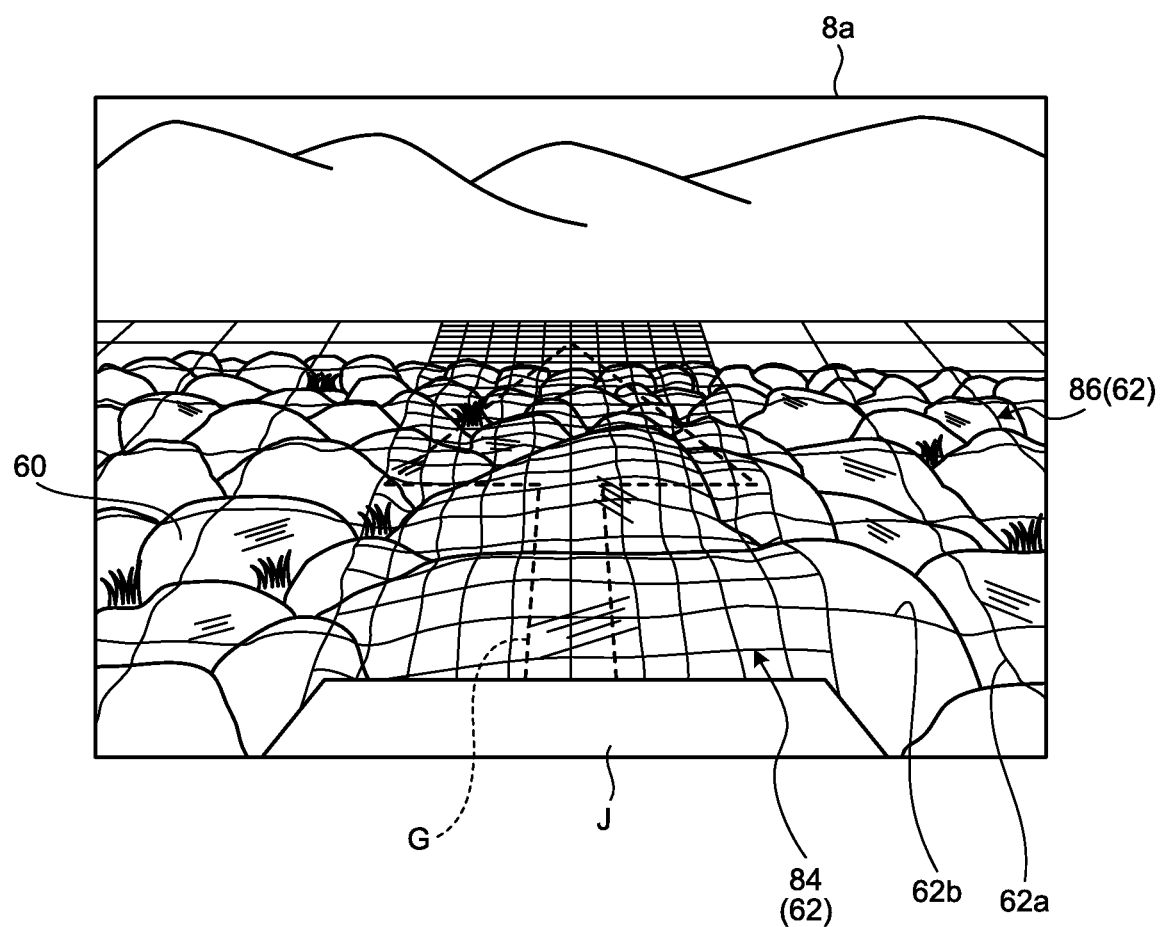
FIG. 17 is a display example in which wire density (pitch) of the wire frame in a region in the route direction of the vehicle is caused to be "dense", and wire density of the wire frame in other regions is caused to be "sparse" in the periphery monitoring apparatus according to the embodiments.

FIG. 17 is a modification of the example illustrated in FIG. 16. The display mode setting unit 50 varies the display mode of the indicator (wire frame 62) between a region desired to be noticed and other regions of the road surface 60. Specifically, the wire frame acquisition unit 42 causes wire density of the wire frame 62 in a region including the recommended route G to be "dense", and acquires a wire frame 84 that makes the irregular shape distinctive following the irregular shape of the road surface 60 more closely. On the other hand, the wire frame acquisition unit 42 acquires a wire frame 86 obtained by causing the wire density of the wire frame 62 in a region not including the recommended route G to be "sparse" as compared with the wire frame 84. In the example of FIG. 17, the wire density of the wire frame 84 is twice the wire density of the wire frame 62, and the wire density of the wire frame 86 is half of that of the wire frame 62. In this case, the wire frame acquisition unit 42 acquires the wire frame 84 having the wire density of "dense" and the wire frame 86 having the wire density of "sparse", and the display mode setting unit 50 cuts out each region in accordance with the direction indicated by the recommended route G and sets the wire frame 84 and the wire frame 86. The superimposition unit 54 then superimposes the wire frame 84 and the wire frame 86 set by the display mode setting unit 50 onto the three-dimensional model image 3DG acquired by the model image acquisition unit 34 to generate the screen 8a as illustrated in FIG. 17. Also in a case of FIG. 17, the host vehicle image J indicating the vehicle 1 is displayed at the lower end of the screen 8a, so that it is possible to easily recognize a positional relation between the vehicle 1 (host vehicle) and the irregular portion of the road surface 60, a relation between the vehicle 1 (host vehicle) and the wire frame 84 to be noticed, and a relation between the vehicle 1 (host vehicle) and the wire frame 86 the attention degree of which may be reduced as compared with the wire frame 84.

In this way, by superimposing the wire frame 84 and the wire frame 86 onto the three-dimensional model image 3DG to be displayed, the wire frame 84 and the wire frame 86 having different wire density between a region in which the vehicle 1 may travel with high possibility and a region in which the vehicle 1 may travel with low possibility, the shape of the road surface 60 in the region in which the vehicle 1 may travel with high possibility can be grasped more easily, and the irregular state of the entire road surface 60 on the screen 8a can be grasped more easily than the example of FIG. 16. Additionally, the screen 8a may be simplified to be easily viewed, and a processing load for calculating the wire frame 62 (the wire frame 84, the wire frame 86) can be reduced as compared with a case of increasing mesh density of the entire three-dimensional model image 3DG. Also in a case illustrated in FIG. 17, the recommended route G indicates the straight advancing direction by way of example. However, in a case in which the recommended route G is curved in the left direction or the right direction, display regions of the wire frame 84 and the wire frame 86 vary in accordance with the recommended route G. In another embodiment, the wire frame acquisition unit 42 may acquire the wire frame 84 having the wire density of "dense" for a region having a width equivalent to the vehicle width in front of the vehicle 1, and acquire the wire frame 86 having the wire density of "sparse" for other regions irrespective of the recommended route G. As described above with reference to FIG. 13 and FIG. 14, the display mode setting unit 50 may color part of the wire frame 84 and the wire frame 86, vary luminance thereof, and display part of the wire frame 84 and the wire frame 86 with blinking in accordance with the height of the road surface 60 to call attention. A degree of the wire density of the wire frame 62 (the wire frame 84, the wire frame 86) can be appropriately set. The display mode setting unit 50 may set the wire frame 86 having the wire density of "sparse" as standard display, and may set the wire frame 84 having the wire density of "dense" for only a region designated by the user via the operation input unit 10 or the operation unit 14*g*, for example. In this case, specific irregularity information of the road surface 60 can be provided only for a portion especially noticed by the user on the three-dimensional model image 3DG.

The guide processing unit 38 selects, from the ROM 14*b* or the SSD 14*f* for example, data related to a message to be displayed, and a voice message, warning sound, and the like to be output for calling attention when the indicator is displayed. The guide processing unit 38 also selects, from the ROM 14*b* or the SSD 14*f* for example, data for outputting a method of operating the vehicle 1 (an operation instruction and the like for the steering unit 4, the acceleration operating unit 5, the braking operating unit 6, and the like) in a case in which the vehicle 1 is caused to travel following the route indicator (tire route line 78), or in contrast, in a case in which the vehicle 1 is recommended to travel along a route different from a guide indicator, for example. In a case in which emphasized display is performed by the display mode setting unit 50, for example, in a case in which a region through which the vehicle 1 should avoid passing is presented, the guide processing unit 38 may display a mark indicating a region through which the vehicle 1 can pass more easily than the former region, or a mark (for example, an arrow) indicating a direction of the region. By displaying such a mark, a route along which the vehicle 1 can travel can be more easily searched for.

The output unit 40 outputs, to the display control unit 14*d*, a superimposition result (superimposition of the three-dimensional model image 3DG and the indicator) obtained by the superimposition unit 54, the display mode set by the display mode setting unit 50, the message for calling attention and operation procedure information from the guide processing unit 38, and the like. In a case in which the guide processing unit 38 selects a voice message, the message data is output to the voice control unit 14*e*.

Figure 18:
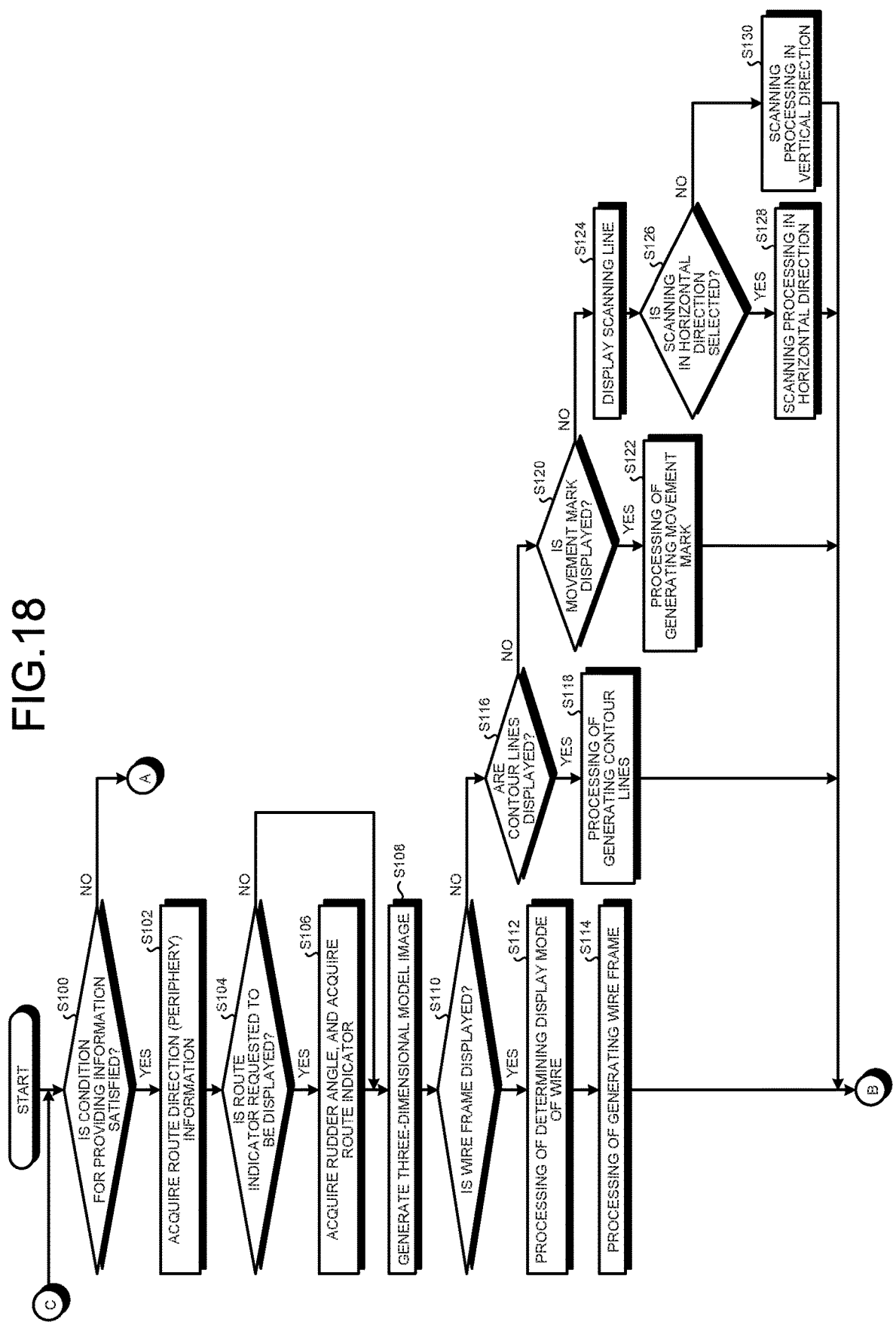
FIG. 18 is a flowchart for explaining a first half of processing procedure in a case of displaying the indicator in the periphery monitoring apparatus according to the embodiments.
Figure 19:
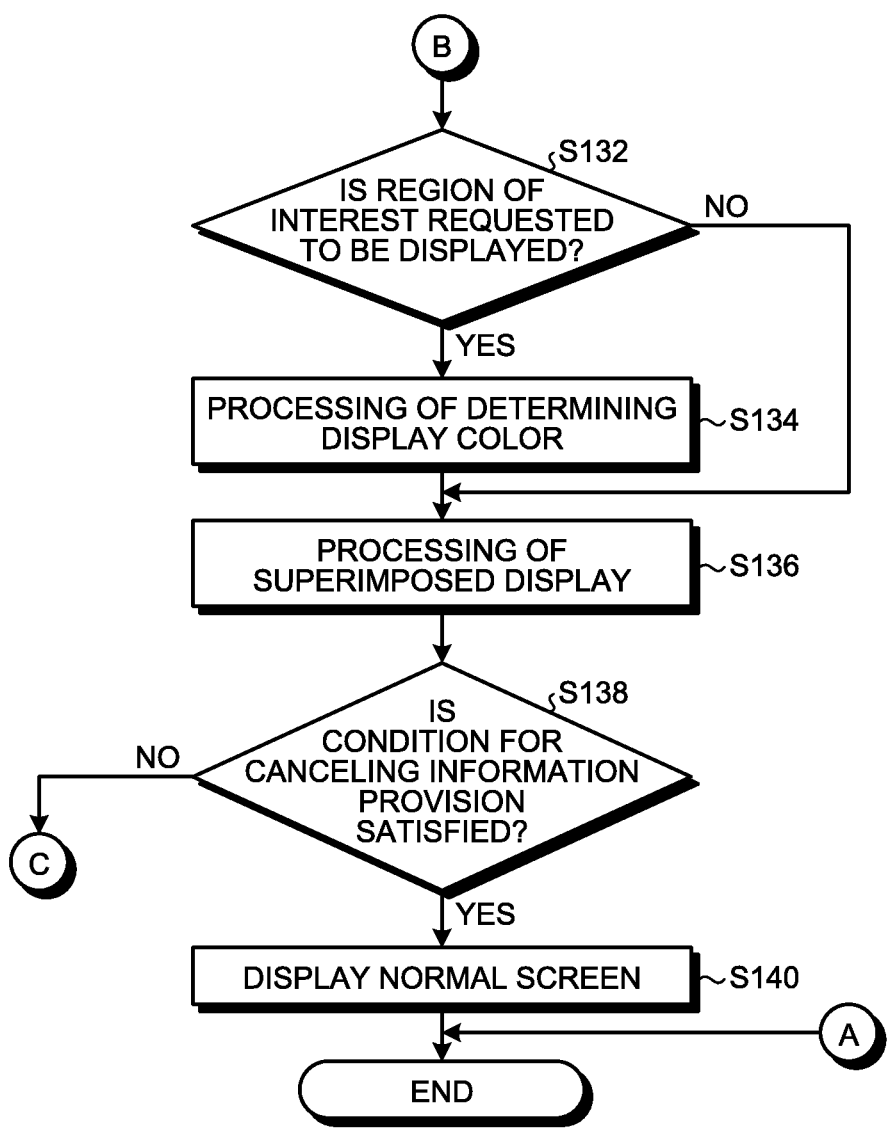
FIG. 19 is a flowchart for explaining a second half of the processing procedure in a case of displaying the indicator in the periphery monitoring apparatus according to the embodiments.

The following describes an example of display processing of the indicator as described above using flowcharts in FIG. 18 and FIG. 19. FIG. 18 is a flowchart for explaining a first half of the processing, and FIG. 19 is a flowchart for explaining a second half of the processing.

First, the CPU 14*a* detects whether there is a signal indicating that a condition is satisfied for permitting information related to the indicator (the wire frame 62, the contour lines 64, the movement mark 66, the first scanning line 68, the second scanning line 70, and the like) to be provided (S100). For example, in a case in which a navigation display mode or an audio screen display mode is selected as the display mode of the display device 8, or in a case in which the speed of the vehicle 1 is equal to or higher than predetermined speed (for example, equal to or higher than 20 km/h), it is determined that there is no display request for the indicator, or the indicator is not desired to be displayed in the traveling state, and the CPU 14*a* temporarily ends this procedure (No at S100). The condition for providing information can be appropriately changed by the user and the like.

If the condition for providing information is satisfied (Yes at S100), for example, in a case in which the user requests the indicator to be displayed by operating the operation input unit 10 or the operation unit 14*g* and the vehicle speed of the vehicle 1 is lower than the predetermined speed, the peripheral information acquisition unit 30 acquires information about the route direction of the vehicle 1 (S102). For example, in a case in which the gear shift operating unit 7 does not indicate "backward movement", the peripheral information acquisition unit 30 acquires taken image data having an imaging range including a peripheral region in front of the vehicle 1 in the imaging unit 15*c*. In a case in which the imaging unit 15*c* is a stereo camera, the peripheral information acquisition unit 30 also acquires three-dimensional information of the imaging range at the same time. In a case in which the imaging unit 15*c* is a monocular camera, the peripheral information acquisition unit 30 acquires the taken image data having the imaging range including the peripheral region in front of the vehicle 1 from the imaging unit 15*c*, and also acquires the three-dimensional information of a front region of the vehicle 1 from the laser scanner 28. Subsequently, if the CPU 14*a* acquires a signal for requesting the route indicator (for example, the tire route line 78) to be displayed together with the indicator (Yes at S104), the CPU 14*a* acquires a current rudder angle of the vehicle 1 from a detection result of the rudder angle sensor 19 via the rudder angle acquisition unit 32, and acquires the route indicator (for example, the tire route line 78) based on the current rudder angle via the route indicator acquisition unit 52 (S106). If the CPU 14*a* cannot acquire the signal for requesting the route indicator (for example, the tire route line 78) to be displayed within a predetermined period (No at S104), the CPU 14*a* skips the process at S106.

Subsequently, the CPU 14*a* causes the model image acquisition unit 34 to generate a three-dimensional model image based on the taken image data having the imaging range including the peripheral region in front of the vehicle 1 and the three-dimensional information acquired by the peripheral information acquisition unit 30 (S108). If the CPU 14*a* acquires a signal for requesting a "wire frame" to be displayed as the indicator from the user via the operation input unit 10 or the operation unit 14*g* (Yes at S110), the CPU 14*a* performs processing of receiving the display mode of the wire frame from the user via the operation input unit 10 or the operation unit 14*g* (S112). At this point, the wire frame acquisition unit 42 determines which of the display modes in FIG. 5, FIG. 15, FIG. 16, and FIG. 17 is used for displaying the wire frame (62, 80, 82, 84, 86). The wire frame acquisition unit 42 performs processing of generating the wire frame (62, 80, 82, 84, 86) in the display mode determined at S112 (S114).

At S110, if the CPU 14*a* does not acquire the signal for requesting the "wire frame" to be displayed as the indicator via the operation input unit 10 or the operation unit 14*g* within a predetermined period (No at S110), and acquires a signal for requesting "contour lines" to be displayed (Yes at S116), the contour line acquisition unit 44 performs processing of generating the contour lines 64 (S118).

At S116, if the CPU 14*a* does not acquire the signal for requesting "contour lines" to be displayed as the indicator via the operation input unit 10 or the operation unit 14*g* within a predetermined period (No at S116), and acquires a signal for requesting the "movement mark" to be displayed (Yes at S120), the movement mark setting unit 46 performs processing of generating the movement mark 66 (S122).

At S120, if the CPU 14*a* does not acquire the signal for requesting the "movement mark" to be displayed as the indicator via the operation input unit 10 or the operation unit 14*g* within a predetermined period (No at S120), the CPU 14*a* causes the display device 8 to display the fact that a "scanning line" is displayed, and causes the user to select whether to scan the scanning line in the horizontal direction or in the vertical direction on the display device 8 via the operation input unit 10 or the operation unit 14g, for example (S124). If the horizontal direction (vehicle width direction) is selected as the scanning direction of the scanning line (Yes at S126), the scanning line setting unit 48 performs processing of generating the first scanning line 68 (S128). If the vertical direction (vehicle longitudinal direction) is selected as the scanning direction of the scanning line at S126 (No at S126), the scanning line setting unit 48 performs processing of generating the second scanning line 70 (S130). In a case in which the first scanning line 68 or the second scanning line 70 is directly selected in a process of selecting the type of the indicator to be displayed, the step at S124 may be omitted.

In a case in which the indicator to be superimposed on the three-dimensional model image 3DG to be displayed is determined, the display mode setting unit 50 determines a display color of the indicator to be a complementary color of the display color of the road surface 60 in the three-dimensional model image 3DG acquired by the model image acquisition unit 34.

Subsequently, if the CPU 14a acquires, via the operation input unit 10 or the operation unit 14g, a signal indicating a display request for a region of interest that indicates a case in which the height of the road surface 60 is higher than a current position of the vehicle 1 by a predetermined threshold or more (Yes at S132), the display mode setting unit 50 performs display color determination processing (S134). For example, the display mode setting unit 50 performs processing of coloring the region 72 to be noticed as illustrated in FIG. 13 and FIG. 14. The superimposition unit 54 then superimposes the indicator in the determined displayed mode onto the three-dimensional model image 3DG to be displayed on the display device 8 via the output unit 40 (S136). If the CPU 14a does not acquire the signal indicating the display request for the region of interest at S132 (No at S132), the CPU 14a skips the process at S134.

During a period in which the indicator is superimposed and displayed on the three-dimensional model image 3DG, the CPU 14a detects whether there is a signal indicating that a condition for canceling information provision is satisfied (S138). For example, in a case in which a navigation screen display mode or an audio screen display mode is selected as the display mode of the display device 8, or in a case in which the speed of the vehicle 1 becomes equal to or higher than predetermined speed (for example, equal to or higher than 20 km/h), the display request for the indicator is canceled or the traveling state proceeds to a state in which the indicator is not desired to be displayed, and it is determined that the condition for canceling information provision is satisfied (Yes at S138). The CPU 14a then displays a navigation screen or an audio screen required to be displayed on the display device 8, or displays a normal screen to be displayed during traveling without hindrance (S140), and temporarily ends this procedure.

If the CPU 14a determines that the condition for canceling information provision is not satisfied at S138 (No at S138), the CPU 14a determines that the user requests the guide indicator to be continuously displayed, advances the process to S100, and performs display (update) processing of the indicator.

In this way, the periphery monitoring system 100 according to the present embodiment superimposes the indicator indicating the height of the road surface 60 based on the height data of the road surface 60 on each region included in the acquired three-dimensional model image 3DG so that the irregular state of the road surface 60 can be viewed more stereoscopically, and the stereoscopic effect thereof can be grasped more easily. As a result, the state of the road surface 60 on which the vehicle 1 is going to travel can be grasped more easily, and for example, a route on which the vehicle 1 can travel more comfortably can be easily selected, and efficient traveling can be achieved. With the periphery monitoring system 100 according to the present embodiment, the irregular shape of the road surface 60 can be grasped more easily, so that, for example, a treacherous route (rough road) can be intentionally selected to provide a traveling form for giving pleasure of traveling on a rough terrain road (off-road). Also in such a case, the route corresponding to the irregular state of the road surface 60 can be appropriately selected, so that pleasure of off-road traveling can be improved.

Figure 20:
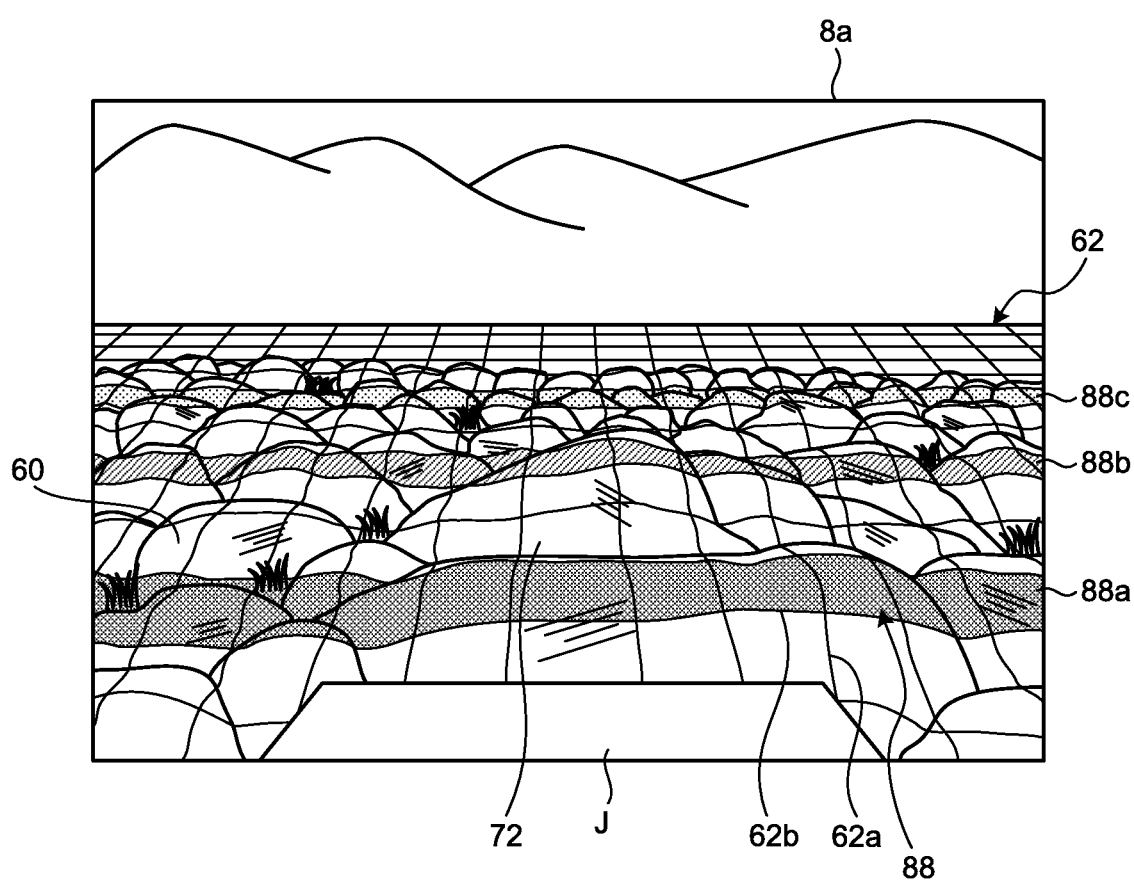
FIG. 20 is an example of superimposing the wire frame as the indicator onto the three-dimensional model image in the periphery monitoring apparatus according to the embodiments, and is a display example of varying the display color of part of the regions surrounded by the wire frame to indicate a separation distance in front of the vehicle.

FIG. 20 illustrates a modification of emphasized display of the wire frame 62. FIG. 20 illustrates an example in which, while the wire frame 62 is superimposed on the three-dimensional model image 3DG to be displayed to cause the irregular state of the road surface 60 to be viewed more stereoscopically and clearly, the display mode setting unit 50 sets a distance indicator 88 to cause a sense of distance from the vehicle 1 (host vehicle image J) to be easily understood. In a case of FIG. 20, a distance indicator 88a, a distance indicator 88b, and a distance indicator 88c are displayed in front of the host vehicle image J. The second wire 62b constituting the wire frame 62 includes information about an X-direction (for example, the vehicle width direction), a Y-direction (for example, the vehicle longitudinal direction), and a Z-direction (for example, the height direction) as the three-dimensional information, so that the CPU 14a can detect a distance from the vehicle 1 (host vehicle image J). Thus, the display mode setting unit 50 displays the distance indicator 88a at a position on the three-dimensional model image 3DG corresponding to a position at a distance of 1.0 m from the vehicle 1, for example. The display mode setting unit 50 also displays the distance indicator 88b at a position on the three-dimensional model image 3DG corresponding to a position at a distance of 3.0 m from the vehicle 1. The display mode setting unit 50 also displays the distance indicator 88c at a position on the three-dimensional model image 3DG corresponding to a position at a distance of 5.0 m from the vehicle 1. In this way, by displaying the distance indicator 88, a sense of depth of the three-dimensional model image 3DG that seems stereoscopic can be further clarified, and the irregular state of the road surface 60 can be grasped more accurately. The number of distance indicators 88 to be displayed can be appropriately modified, and may be smaller than three or larger than three. In a case of FIG. 20, the distance indicator 88 is displayed by coloring the region 72 surrounded by the first wire 62a and the second wire 62b constituting the wire frame 62. Alternatively, the distance indicator 88 may be displayed by causing the display color of the second wire 62b to be different from the other display colors, varying luminance thereof, or displaying the second wire 62b with blinking.

Figure 21:
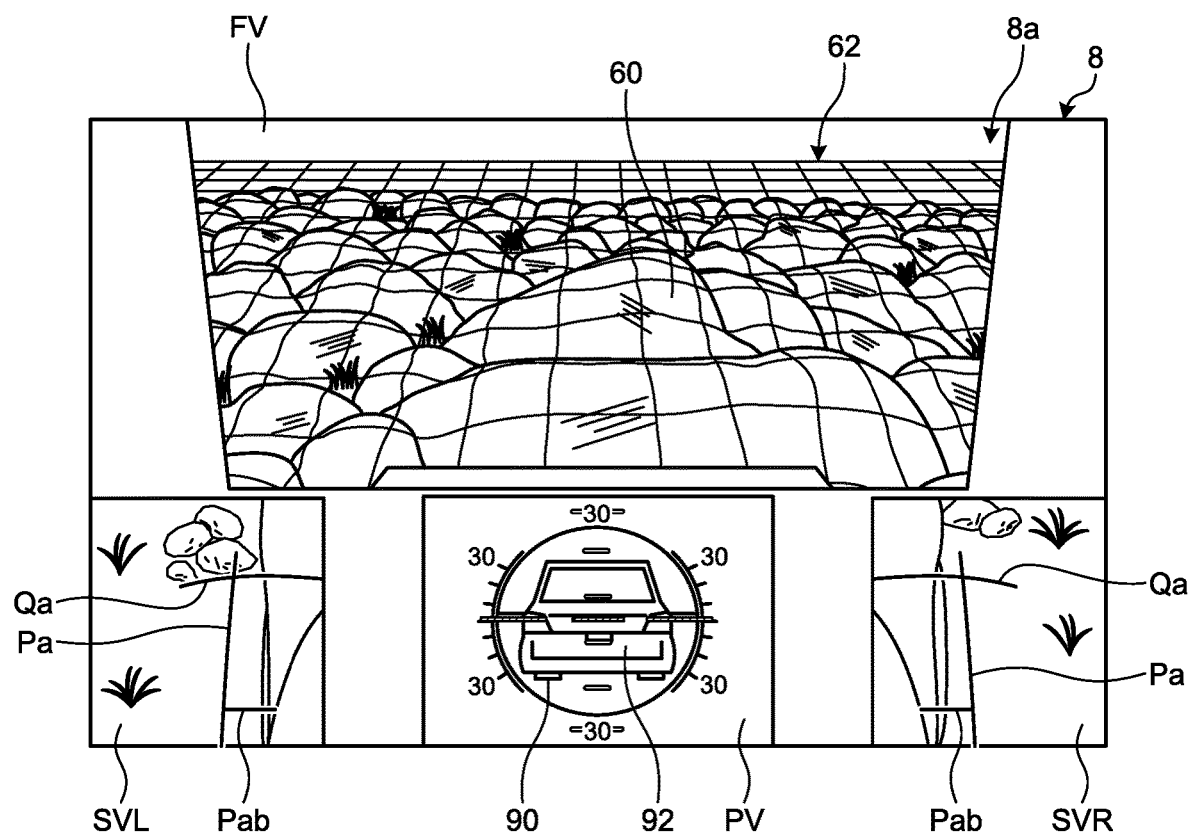
FIG. 21 is an explanatory diagram for explaining another layout example of a display region of the display device in a case of displaying the indicator in the periphery monitoring apparatus according to the embodiments.

FIG. 21 illustrates a display example of the display device 8 including other additional information. In the display examples described above, the screen 8a displays information of a forward region (only one region) of the vehicle 1. On the other hand, in a case of a modification illustrated in FIG. 21, the display device 8 displays images in various directions, an angle meter 90 indicating an orientation of the vehicle 1, and the like while dividing the display region into a plurality of regions. For example, a forward display region FV is disposed at a central upper part of the display region of the display device 8, a left side display region SVL is disposed obliquely downward to the left of the forward display region FV, and a right side display region SVR is disposed obliquely downward to the right of the forward display region FV. An orientation display region PV that displays the angle meter 90 is disposed below the forward display region FV. In the forward display region FV, any one of (in a case of FIG. 21, FIG. 5) or some of the display examples illustrated in FIG. 5, FIG. 8, FIG. 9 to FIG. 11, FIG. 13 to FIG. 17, and FIG. 20 can be displayed. A left side image of the vehicle 1 (for example, a left side overhead image) based on the taken image data acquired by the imaging unit 15*d* is displayed in the left side display region SVL, and a right side image of the vehicle 1 (for example, a right side overhead image) based on the taken image data acquired by the imaging unit 15*b* is displayed in the right side display region SVR. The road surface 60 on both sides of the vehicle 1 and part of the respective wheels 3 can be reflected in the left side image and the right side image. A forward reference line Qa indicating a rough measure of a distance from the end part 2*c* on the front side of the vehicle body 2, a side reference line Pa indicating a rough measure of a distance from the end parts 2*d* and 2*f* on both sides of the vehicle body 2, and the like can be superimposed on the left side display region SVL and the right side display region SVR to be displayed.

Due to such display, the state of the road surface 60 around the vehicle 1 can be understood more easily. Additionally, display is made so that a correspondence relation between the forward display region FV, and the left side display region SVL and the right side display region SVR can be understood more easily. A grounding line Pab indicating a grounding position of the front wheel 3F is added to each of side reference lines Pa of the left side display region SVL and the right side display region SVR, so that the position of the front wheel 3F can be easily understood.

The angle meter 90 displays inclination (a roll angle) in the horizontal direction of the vehicle 1 and inclination (a pitch angle) in the longitudinal direction thereof as orientation of a symbol 92 based on a signal from the acceleration sensor 26 (26*a*, 26*b*). By displaying the orientation of the symbol 92 and the indicator (the wire frame 62 and the like) on the same screen, the situation of the road surface 60 around the vehicle 1 can be grasped more easily.

A layout of the display region of the display device 8 illustrated in FIG. 21 is merely an example, and various layouts can be employed. For example, a size in the vertical direction of the left side display region SVL and the right side display region SVR may be expanded to extend to the side of the forward display region FV. In this way, by arranging the left side display region SVL and the right side display region SVR to surround the forward display region FV, the situation around the vehicle 1 centered on a driver's seat can be displayed on the display device 8 in a state of being more easily grasped.

In a case in which the imaging unit 15*c* is constituted of a stereo camera, when a malfunction occurs in one of two cameras, the three-dimensional information cannot be acquired. In this case, the peripheral information acquisition unit 30 may switch the imaging unit 15*c* to be dedicated for acquiring the peripheral image to be able to provide at least a peripheral image (two-dimensional image) of the vehicle 1.

FIG. 17 illustrates an example in which the wire density of the region including the direction of the recommended route G is caused to be "dense", and the wire density of the other regions is caused to be "sparse". In another embodiment, the wire density may be varied in accordance with a degree of gradient of the road surface 60. For example, the wire density may be caused to be "dense" in a case in which the gradient of the road surface 60 is equal to or larger than a predetermined value, and the wire density may be caused to be "sparse" in a case in which the gradient thereof is smaller than the predetermined value. In this case, the gradient state of the road surface 60 can be easily grasped due to the wire density, and the shape of the road surface 60 can be intuitively and easily grasped.

FIG. 15 and FIG. 16 illustrate an example of superimposing the wire frame 62 (the wire frame 80, the wire frame 82) in the direction indicated by the route indicator. In another embodiment, the wire frame 62 may be superimposed only on a portion with which a bottom face of the vehicle body 2 of the vehicle 1 may be brought into contact. In this case, a display amount of the wire frame 62 can be made minimum, so that display content of the screen 8*a* can be simplified while clarifying a portion to be noticed on the road surface 60 to improve the visibility of the three-dimensional model image 3DG.

In the embodiment described above, exemplified is a case in which the condition for displaying the three-dimensional model image 3DG and the indicator is that the speed of the vehicle 1 is lower than the predetermined speed. In another embodiment, the three-dimensional model image 3DG and the indicator may be displayed while the vehicle 1 is stopping, and when the vehicle 1 starts to travel, the indicator may be hidden and the three-dimensional model image 3DG may be kept being displayed until the speed reaches the predetermined speed. In this case, the display content of the screen 8*a* is simplified due to the hidden indicator, which contributes to improvement in concentration of a driver for a driving operation in low-speed traveling while causing the driver to grasp the situation of the road surface 60.

The embodiment and modifications of the present invention have been described above. However, these embodiment and modifications are merely examples, and do not intend to limit the scope of the invention. The novel embodiments can be implemented in other various forms, and can be variously omitted, replaced, and modified without departing from the gist of the invention. These embodiments and the modifications thereof are encompassed by the scope and the gist of the invention, and encompassed by the invention and equivalent thereof described in CLAIMS.

REFERENCE SIGNS LIST

1 VEHICLE
3 WHEEL
3F FRONT WHEEL
4 STEERING UNIT
8 DISPLAY DEVICE
8*a* SCREEN
10 OPERATION INPUT UNIT
11 MONITOR DEVICE
14 ECU
14*a* CPU
14*b* ROM
14*c* RAM
15 IMAGING UNIT
19 RUDDER ANGLE SENSOR
26 ACCELERATION SENSOR
30 PERIPHERAL INFORMATION ACQUISITION UNIT
32 RUDDER ANGLE ACQUISITION UNIT

34 MODEL IMAGE ACQUISITION UNIT (ACQUISITION UNIT)
36 INDICATOR CONTROL UNIT (CONTROL UNIT)
38 GUIDE PROCESSING UNIT
40 OUTPUT UNIT
42 WIRE FRAME ACQUISITION UNIT
44 CONTOUR LINE ACQUISITION UNIT
46 MOVEMENT MARK SETTING UNIT
48 SCANNING LINE SETTING UNIT
50 DISPLAY MODE SETTING UNIT
52 ROUTE INDICATOR ACQUISITION UNIT
54 SUPERIMPOSITION UNIT
60 ROAD SURFACE
62, 82, 84, AND 86 WIRE FRAME
62a FIRST WIRE
62b SECOND WIRE
64, 64a, 64b, AND 64c CONTOUR LINE
66 MOVEMENT MARK
68 FIRST SCANNING LINE
70 SECOND SCANNING LINE
78 TIRE ROUTE LINE (ROUTE INDICATOR)
3DG THREE-DIMENSIONAL MODEL IMAGE

The invention claimed is:

1. A periphery monitoring apparatus comprising:
an acquisition unit configured to acquire a three-dimensional model image indicating an irregular state of a road surface, the three-dimensional model image including image data outputted from an imaging unit that takes a peripheral image including the road surface in a traveling direction of a vehicle and including height data that indicates heights of individual regions of the road surface represented in the peripheral image; and
a control unit configured to superimpose an indicator indicating a height of the road surface based on the height data onto each region included in the acquired three-dimensional model image and display the three-dimensional model image on a display device, the indicator being a wire frame indicating the irregular state of the road surface, the wire frame including a plurality of rectangles surrounded by a first wire and a second wire, each of the plurality of rectangles being deformed in accordance with the height data of each of the regions of the road surface included in the three-dimensional model image, wherein the control unit:
superimposes, together with the indicator, a route indicator indicating an estimated traveling direction based on a rudder angle of the vehicle onto the three-dimensional model image, the rudder angle indicating a rotation angle of a steering unit acquired by a rudder angle sensor,
superimposes the indicator onto a first region on which the route indicator is superimposed, the first region being one of the regions of the road surface, and
superimposes another indicator indicating the height of the road surface on a second region, the other indicator having a visual characteristic different from a visual characteristic of the indicator, the second region being one of the regions of the road surface other than the first region.

2. The periphery monitoring apparatus according to claim 1, wherein the indicator is a contour line that connects a plurality of positions having the same height with respect to a predetermined surface of the road surface.

3. The periphery monitoring apparatus according to claim 1, wherein
the indicator is a plurality of movement marks that are movable in accordance with a gradient direction of each region of the three-dimensional model image, and
the control unit causes moving speed of the movement marks to vary in accordance with a gradient state of each region.

4. The periphery monitoring apparatus according to claim 1, wherein the indicator is a scanning line that moves in a predetermined direction on the three-dimensional model image, the scanning line indicating the height of the road surface based on the height data.

5. The periphery monitoring apparatus according to claim 1, wherein the control unit displays the indicator with a complementary color of a color of the road surface in a region of the three-dimensional model image on which the indicator is superimposed.

6. The periphery monitoring apparatus according to claim 1, wherein the control unit changes a visual characteristic of the indicator in accordance with the height of the road surface.

* * * * *